(12) United States Patent
Xu et al.

(10) Patent No.: US 10,681,717 B2
(45) Date of Patent: Jun. 9, 2020

(54) DATA TRANSMISSION METHOD, DEVICE, AND SYSTEM

(71) Applicant: Huawei Technologies Co., Ltd., Shenzhen, Guangdong (CN)

(72) Inventors: Xiaoying Xu, Shanghai (CN); Tianle Deng, Shanghai (CN); Xiaoxiao Zheng, Shanghai (CN); Li Yang, Shanghai (CN); Kaijie Zhou, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 0 days.

(21) Appl. No.: 15/963,573

(22) Filed: Apr. 26, 2018

(65) Prior Publication Data

US 2018/0249492 A1    Aug. 30, 2018

Related U.S. Application Data

(63) Continuation of application No. PCT/CN2015/093249, filed on Oct. 29, 2015.

(51) Int. Cl.
*H04W 72/12* (2009.01)
*H04W 72/04* (2009.01)
(Continued)

(52) U.S. Cl.
CPC ......... *H04W 72/1273* (2013.01); *H04L 1/004* (2013.01); *H04L 1/0061* (2013.01);
(Continued)

(58) Field of Classification Search
CPC ............ H04L 1/18; H04L 1/00; H04W 72/12; H04W 74/00; H04W 72/1273; H04W 74/006
See application file for complete search history.

(56) References Cited

U.S. PATENT DOCUMENTS

2014/0376461 A1    12/2014 Park et al.
2015/0172029 A1     6/2015 Suzuki et al.
(Continued)

FOREIGN PATENT DOCUMENTS

CN    101998611 A    3/2011
CN    104066194 A    9/2014
(Continued)

OTHER PUBLICATIONS

Office Action issued in Chinese Application No. 201580044395.8 dated Apr. 17, 2019, 8 pages.

*Primary Examiner* — Chi Ho A Lee
(74) *Attorney, Agent, or Firm* — Fish & Richardson P.C.

(57) ABSTRACT

Embodiments of the present application provide a data transmission method, a device, and a system, and relate to the communications field, to reduce signaling exchanges between an access network device and a UE, thereby saving network resources and improving data transmission efficiency. The data transmission method includes: receiving, by a user equipment UE, a scrambled control channel; descrambling, by the UE, the scrambled control channel by using a first identifier, to obtain control information and cyclic redundancy code CRC; and after the UE completes a check on the CRC, receiving, by the UE according to the control information, data sent by an access network device.

9 Claims, 13 Drawing Sheets

(51) Int. Cl.
  *H04L 1/00*    (2006.01)
  *H04L 1/18*    (2006.01)
  *H04W 74/00*   (2009.01)

(52) U.S. Cl.
  CPC .......... *H04L 1/1812* (2013.01); *H04L 1/1854* (2013.01); *H04W 72/04* (2013.01); *H04W 74/006* (2013.01)

(56) References Cited

U.S. PATENT DOCUMENTS

| | | | | |
|---|---|---|---|---|
| 2015/0319633 | A1* | 11/2015 | Ji | H04B 7/0452 370/252 |
| 2015/0365914 | A1 | 12/2015 | Yu et al. | |
| 2016/0013891 | A1* | 1/2016 | Ji | H04L 1/16 370/389 |
| 2016/0065285 | A1* | 3/2016 | Nammi | H04B 7/0486 370/252 |
| 2016/0081115 | A1 | 3/2016 | Pang et al. | |
| 2016/0128039 | A1* | 5/2016 | Lim | H04L 5/0053 370/330 |
| 2016/0192388 | A1* | 6/2016 | Ekpenyong | H04W 72/1284 370/329 |
| 2016/0212734 | A1* | 7/2016 | He | H04L 5/0055 |
| 2016/0255609 | A1 | 9/2016 | Kim et al. | |
| 2017/0019882 | A1* | 1/2017 | Nimbalker | H04W 72/042 |
| 2017/0208552 | A1* | 7/2017 | Ohwatari | H04J 11/004 |
| 2017/0325277 | A1* | 11/2017 | Fujishiro | H04W 4/06 |
| 2017/0353273 | A1* | 12/2017 | Zhang | H04W 4/06 |
| 2018/0184461 | A1* | 6/2018 | Zhang | H04W 74/08 |

FOREIGN PATENT DOCUMENTS

| | | |
|---|---|---|
| CN | 104137635 A | 11/2014 |
| CN | 104412625 A | 3/2015 |
| CN | 104885497 A | 9/2015 |
| EP | 2728787 A2 | 5/2014 |
| EP | 2802091 A1 | 11/2014 |
| WO | 2012058797 A1 | 5/2012 |
| WO | 2014186964 A1 | 11/2014 |

* cited by examiner

DATA TRANSMISSION METHOD, DEVICE, AND SYSTEM

CROSS-REFERENCE TO RELATED APPLICATIONS

This application is a continuation of International Application No. PCT/CN2015/093249, filed on Oct. 29, 2015, which is hereby incorporated by reference in its entirety.

TECHNICAL FIELD

The present application relates to the communications field, and in particular, to a data transmission method, a device, and a system.

BACKGROUND

Popularization of machine-to-machine (M2M) technologies increases data transmission between user equipment (UE) and access network devices.

When an existing access network device sends data to a UE in an idle state, a non-synchronous state, or a loose synchronous state, the access network device needs to initiate paging to the UE first. After receiving paging information sent by the access network device, the UE usually chooses to establish a radio link to the access network device in a random access manner. The UE can send paging response information to the access network device only after the radio link between the UE and the access network device is established. Afterwards, the UE receives the data sent by the access network device.

However, in the foregoing data transmission process, because the UE establishes the radio link to the access network device by means of random access, there are multiple signaling exchanges between the UE and the access network device. Consequently, relatively more network resources are occupied and data transmission efficiency is low.

SUMMARY

Embodiments of the present application provide a data transmission method, a device, and a system, to reduce signaling exchanges between an access network device and UE, thereby saving network resources and improving data transmission efficiency.

To achieve the foregoing objective, the following technical solutions are used in the embodiments of the present application.

According to a first aspect, an embodiment of the present application provides a data transmission method, including:

receiving, by a user equipment UE, a scrambled control channel;

descrambling, by the UE, the scrambled control channel by using a first identifier, to obtain control information and cyclic redundancy code CRC; and after the UE completes a check on the CRC, receiving, by the UE according to the control information, data sent by an access network device.

In the data transmission method provided in this embodiment of the present application, the UE receives and decodes the scrambled control channel to obtain the control information and the CRC, and after completing the check on the CRC, the UE can directly receive, according to the control information, the data sent by the access network device. Therefore, a process in which the UE randomly accesses the access network device is omitted, so that signaling exchanges between the access network device and the UE are reduced, thereby saving network resources and improving data transmission efficiency.

Further, the first identifier is at least one of a higher layer identifier of the UE or a radio network temporary identifier RNTI. Therefore, the scrambled control channel may be descrambled in different descrambling manners according to different information included in the first identifier.

Optionally, the higher layer identifier of the UE is any one or more of a system architecture evolution-temporary mobile subscriber identity S-TMSI, a mobility management entity-temporary mobile subscriber identity M-TMSI, an international mobile subscriber identity IMSI, or an Internet Protocol IP address of the UE.

In a first possible implementation, when the first identifier is the higher layer identifier of the UE, a method for descrambling, by the UE, the scrambled control channel by using the first identifier, to obtain the control information and the CRC specifically includes:

decoding, by the UE, the scrambled control channel, to obtain scrambled CRC and scrambled control information; and separately descrambling, by the UE, the scrambled CRC and the scrambled control information by using the higher layer identifier of the UE, to obtain the control information and the CRC; or decoding, by the UE, the scrambled control channel, to obtain the CRC and scrambled control information; and descrambling, by the UE, the scrambled control information by using the higher layer identifier of the UE, to obtain the control information.

In a second possible implementation, when the first identifier is the RNTI, a method for descrambling, by the UE, the scrambled control channel by using the first identifier, to obtain the control information and the CRC specifically includes:

decoding, by the UE, the scrambled control channel, to obtain scrambled CRC and scrambled control information; and separately descrambling, by the UE, the scrambled CRC and the scrambled control information by using the RNTI, to obtain the control information and the CRC; or decoding, by the UE, the scrambled control channel, to obtain the CRC and scrambled control information; and descrambling, by the UE, the scrambled control information by using the RNTI, to obtain the control information; or decoding, by the UE, the scrambled control channel, to obtain scrambled CRC and the control information; and descrambling, by the UE, the scrambled CRC by using the RNTI, to obtain the CRC.

In a third possible implementation, when the first identifier is the higher layer identifier of the UE and the RNTI, a method for descrambling, by the UE, the scrambled control channel by using the first identifier, to obtain the control information and the CRC specifically includes:

descrambling, by the UE, the scrambled control channel by using the higher layer identifier of the UE, to obtain the control information and scrambled CRC; and descrambling, by the UE, the scrambled CRC by using the RNTI, to obtain the CRC; or decoding, by the UE, the scrambled control channel, to obtain scrambled CRC and scrambled control information;

descrambling, by the UE, the scrambled control information by using the higher layer identifier of the UE, to obtain the control information; and descrambling, by the UE, the scrambled CRC by using the RNTI, to obtain the CRC.

Further, after the receiving, by the UE according to the control information, data sent by an access network device, the method further includes:

sending, by the UE, acknowledgement feedback information to the access network device, where a resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource; and a feedback timing of the acknowledgement feedback information is preset or is indicated by the downlink scheduling.

Further, if the UE does not successfully receive the data sent by the access network device, the method further includes:

sending, by the UE, unacknowledgement information to the access network device.

According to a second aspect, an embodiment of the present application provides a data transmission method, including:

sending, by an access network device, a scrambled control channel to a user equipment UE, where the scrambled control channel is scrambled by the access network device by using a first identifier; and sending, by the access network device, data to the UE.

In the data transmission method provided in this embodiment of the present application, the access network device sends the scrambled control channel to the UE, so that the UE can directly receive, according to the control information, the data sent by the access network device. Therefore, a process in which the UE randomly accesses the access network device is omitted, so that signaling exchanges between the access network device and the UE are reduced, thereby saving network resources and improving data transmission efficiency.

Further, the first identifier is at least one of a higher layer identifier of the UE or a radio network temporary identifier RNTI. Therefore, a control channel may be scrambled in different scrambling manners according to different information included in the first identifier.

Optionally, the higher layer identifier of the UE is any one or more of a system architecture evolution-temporary mobile subscriber identity S-TMSI, a mobility management entity-temporary mobile subscriber identity M-TMSI, an international mobile subscriber identity IMSI, or an Internet Protocol IP address of the UE.

Further, before the sending, by an access network device, a scrambled control channel to the UE, the method further includes:

scrambling, by the access network device, a control channel by using the first identifier.

In a first possible implementation, when the first identifier is the higher layer identifier of the UE, the scrambling, by the access network device, a control channel by using the first identifier specifically includes:

obtaining, by the access network device, CRC and control information; and separately scrambling, by the access network device, the CRC and the control information by using the higher layer identifier of the UE, to obtain scrambled CRC and scrambled control information, where the scrambled CRC and the scrambled control information form the scrambled control channel together; or obtaining, by the access network device, CRC and control information; and scrambling, by the access network device, the control information by using the higher layer identifier of the UE, to obtain scrambled control information, where the scrambled control information and the CRC form the scrambled control channel together.

In a second possible implementation, when the first identifier is the RNTI, the scrambling, by the access network device, a control channel by using the first identifier specifically includes:

obtaining, by the access network device, CRC and control information; and separately scrambling, by the access network device, the CRC and the control information by using the RNTI, to obtain scrambled CRC and scrambled control information, where the scrambled CRC and the scrambled control information form the scrambled control channel together; or obtaining, by the access network device, CRC and control information; and scrambling, by the access network device, the control information by using the RNTI, to obtain scrambled control information, where the scrambled control information and the CRC form the scrambled control channel together; or obtaining, by the access network device, CRC and control information; and scrambling, by the access network device, the CRC by using the RNTI, to obtain scrambled CRC, where the scrambled CRC and the control information form the scrambled control channel together.

In a third possible implementation, when the first identifier is the higher layer identifier of the UE and the RNTI, the scrambling, by the access network device, a control channel by using the first identifier specifically includes:

obtaining, by the access network device, CRC and control information;

scrambling, by the access network device, the CRC by using the RNTI, to obtain scrambled CRC; and scrambling, by the access network device, the scrambled CRC and the control information by using the higher layer identifier of the UE, to obtain the scrambled control channel; or obtaining, by the access network device, CRC and control information;

scrambling, by the access network device, the CRC by using the RNTI, to obtain scrambled CRC; and scrambling, by the access network device, the control information by using the higher layer identifier, to obtain scrambled control information, where the scrambled CRC and the scrambled control information form the scrambled control channel together.

Further, after the sending, by the access network device, data to the UE, the method further includes:

receiving, by the access network device, acknowledgement feedback information sent by the UE, where a resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource; and a feedback timing of the acknowledgement feedback information is preset or is indicated by the downlink scheduling.

Further, if the access network device receives unacknowledgement information sent by the UE or the access network device does not receive, within a preset time, the acknowledgement feedback information sent by the UE, the access network device resends the scrambled control channel to the UE.

According to a third aspect, an embodiment of the present application provides a user equipment, including a receiving unit and an analysis unit, where the receiving unit is configured to receive a scrambled control channel;

the analysis unit is configured to: after the receiving unit receives the scrambled control channel, descramble the scrambled control channel by using a first identifier, to obtain control information and cyclic redundancy code CRC and complete a check on the CRC; and the receiving unit is further configured to: after the analysis unit completes the check on the CRC, receive, according to the control information, data sent by an access network device.

For technical effects of the user equipment provided in this embodiment of the present application, refer to technical effects of the user equipment that are described in the data transmission method performed by the user equipment according to the first aspect, and details are not described herein again.

Further, the first identifier is at least one of a higher layer identifier of the UE or a radio network temporary identifier RNTI.

Optionally, the higher layer identifier of the UE is any one or more of a system architecture evolution-temporary mobile subscriber identity S-TMSI, a mobility management entity-temporary mobile subscriber identity M-TMSI, an international mobile subscriber identity IMSI, or an Internet Protocol IP address of the UE.

Further, when the first identifier is the higher layer identifier of the UE, the analysis unit is specifically configured to: decode the scrambled control channel to obtain scrambled CRC and scrambled control information, and separately descramble the scrambled CRC and the scrambled control information by using the higher layer identifier of the UE to obtain the control information and the CRC; or decode the scrambled control channel to obtain the CRC and scrambled control information, and descramble the scrambled control information by using the higher layer identifier of the UE to obtain the control information.

Further, when the first identifier is the RNTI, the analysis unit is specifically configured to: decode the scrambled control channel to obtain scrambled CRC and scrambled control information, and separately descramble the scrambled CRC and the scrambled control information by using the RNTI to obtain the control information and the CRC; or decode the scrambled control channel to obtain the CRC and scrambled control information, and descramble the scrambled control information by using the RNTI to obtain the control information; or decode the scrambled control channel to obtain scrambled CRC and the control information, and descramble the scrambled CRC by using the RNTI to obtain the CRC.

Further, when the first identifier is the higher layer identifier of the UE and the RNTI, the analysis unit is specifically configured to: descramble the scrambled control channel by using the higher layer identifier of the UE to obtain the control information and scrambled CRC, and descramble the scrambled CRC by using the RNTI to obtain the CRC; or decode the scrambled control channel to obtain scrambled CRC and scrambled control information, descramble the scrambled control information by using the higher layer identifier of the UE to obtain the control information, and descramble the scrambled CRC by using the RNTI to obtain the CRC.

Further, the user equipment further includes a sending unit, where the sending unit is configured to: after the receiving unit receives, according to the control information, the data sent by the access network device, send acknowledgement feedback information to the access network device, where a resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource; and a feedback timing of the acknowledgement feedback information is preset or is indicated by the downlink scheduling.

Further, if the receiving unit does not successfully receive the data sent by the access network device, the user equipment further includes a sending unit, where the sending unit is configured to send unacknowledgement information to the access network device.

According to a fourth aspect, an embodiment of the present application provides an access network device, including a sending unit, where the sending unit is configured to send a scrambled control channel to a user equipment UE, where the scrambled control channel is scrambled by the access network device by using a first identifier; and the sending unit is further configured to send data to the UE.

For technical effects of the access network device provided in this embodiment of the present application, refer to technical effects of the access network device described in the data transmission method performed by the access network device according to the second aspect, and details are not described herein again.

Further, the first identifier is at least one of a higher layer identifier of the UE or a radio network temporary identifier RNTI.

Optionally, the higher layer identifier of the UE is any one or more of a system architecture evolution-temporary mobile subscriber identity S-TMSI, a mobility management entity-temporary mobile subscriber identity M-TMSI, an international mobile subscriber identity IMSI, or an Internet Protocol IP address of the UE.

Further, the access network device further includes a scrambling unit, where the scrambling unit is configured to: before the sending unit sends the scrambled control channel to the UE, scramble a control channel by using the first identifier.

Further, when the first identifier is the higher layer identifier of the UE, the scrambling unit is specifically configured to: obtain CRC and control information, and separately scramble the CRC and the control information by using the higher layer identifier of the UE to obtain scrambled CRC and scrambled control information, where the scrambled CRC and the scrambled control information form the scrambled control channel together; or obtain CRC and control information, and scramble the control information by using the higher layer identifier of the UE to obtain scrambled control information, where the scrambled control information and the CRC form the scrambled control channel together.

Further, when the first identifier is the RNTI, the scrambling unit is specifically configured to: obtain CRC and control information, and separately scramble the CRC and the control information by using the RNTI to obtain scrambled CRC and scrambled control information, where the scrambled CRC and the scrambled control information form the scrambled control channel together; or obtain CRC and control information, and scramble the control information by using the RNTI to obtain scrambled control information, where the scrambled control information and the CRC form the scrambled control channel together; or obtain CRC and control information, and scramble the CRC by using the RNTI to obtain scrambled CRC, where the scrambled CRC and the control information form the scrambled control channel together.

Further, when the first identifier is the higher layer identifier of the UE and the RNTI, the scrambling unit is specifically configured to: obtain CRC and control information, scramble the CRC by using the RNTI to obtain scrambled CRC, and scramble the scrambled CRC and the control information by using the higher layer identifier of the UE to obtain the scrambled control channel; or obtain CRC and control information, scramble the CRC by using the RNTI to obtain scrambled CRC, and scramble the control information by using the higher layer identifier to obtain scrambled control information, where the scrambled CRC and the scrambled control information form the scrambled control channel together.

Further, the access network device further includes a receiving unit, where the receiving unit is configured to: after the sending unit sends the data to the UE, receive acknowledgement feedback information sent by the UE, where a resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource; and a feedback timing of the acknowledgement feedback information is preset or is indicated by the downlink scheduling.

Further, the sending unit is further configured to: if the receiving unit receives unacknowledgement information sent by the UE or does not receive, within a preset time, the acknowledgement feedback information sent by the UE, resend the scrambled control channel to the UE.

According to a fifth aspect, an embodiment of the present application provides a user equipment, including a memory, a processor, a communications interface, and a system bus, where the memory, the processor, and the communications interface are connected by using the system bus, the memory is configured to store a computer instruction, and the processor is configured to execute the computer instruction stored in the memory, so that the user equipment performs the data transmission method according to the first aspect or any possible implementation of the first aspect.

According to a sixth aspect, an embodiment of the present application provides an access network device, including a memory, a processor, a communications interface, and a system bus, where the memory, the processor, and the communications interface are connected by using the system bus, the memory is configured to store a computer instruction, and the processor is configured to execute the computer instruction stored in the memory, so that the access network device performs the data transmission method according to the second aspect or any possible implementation of the second aspect.

According to a seventh aspect, an embodiment of the present application provides a paging system. The paging system includes an access network device and at least one user equipment, where the at least one user equipment may be the user equipment according to the third aspect or any possible implementation of the third aspect, and the access network device may be the access network device according to the fourth aspect or any possible implementation of the fourth aspect.

According to an eighth aspect, an embodiment of the present application provides a paging system. The paging system includes an access network device and at least one user equipment, where the at least one user equipment may be the user equipment according to the fifth aspect or any possible implementation of the fifth aspect, and the access network device may be the access network device according to the sixth aspect or any possible implementation of the sixth aspect.

The embodiments of the present application provide the data transmission method, the device, and the system. The user equipment UE receives the scrambled control channel, the UE descrambles the scrambled control channel by using the first identifier, to obtain the control information and the cyclic redundancy code CRC; and after the UE completes the check on the CRC, the UE receives, according to the control information, the data sent by the access network device. Based on descriptions of the foregoing embodiments, compared with a traditional process of establishing a radio link between an access network device and a UE, in the data transmission method provided in the embodiments of the present application, the UE does not need to initiate a random access process, so that signaling exchanges between the access network device and the UE are reduced, thereby saving network resources and improving data transmission efficiency.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION

The following clearly and completely describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Technologies described in this specification may be applied to various communications systems, for example, 2G, 3G, and 4G communications systems and a next-generation communications system, for example, a 2G system such as a Global System for Mobile Communications (GSM), a 3G system such as a Code Division Multiple Access (CDMA) system, a Time Division Multiple Access (TDMA) system, or a Wideband Code Division Multiple Access (WCDMA) system, a 4G system such as a Long Term Evolution (LTE) system, an LTE subsequent evolution standard communications system, or another similar communications system.

Figure 1:
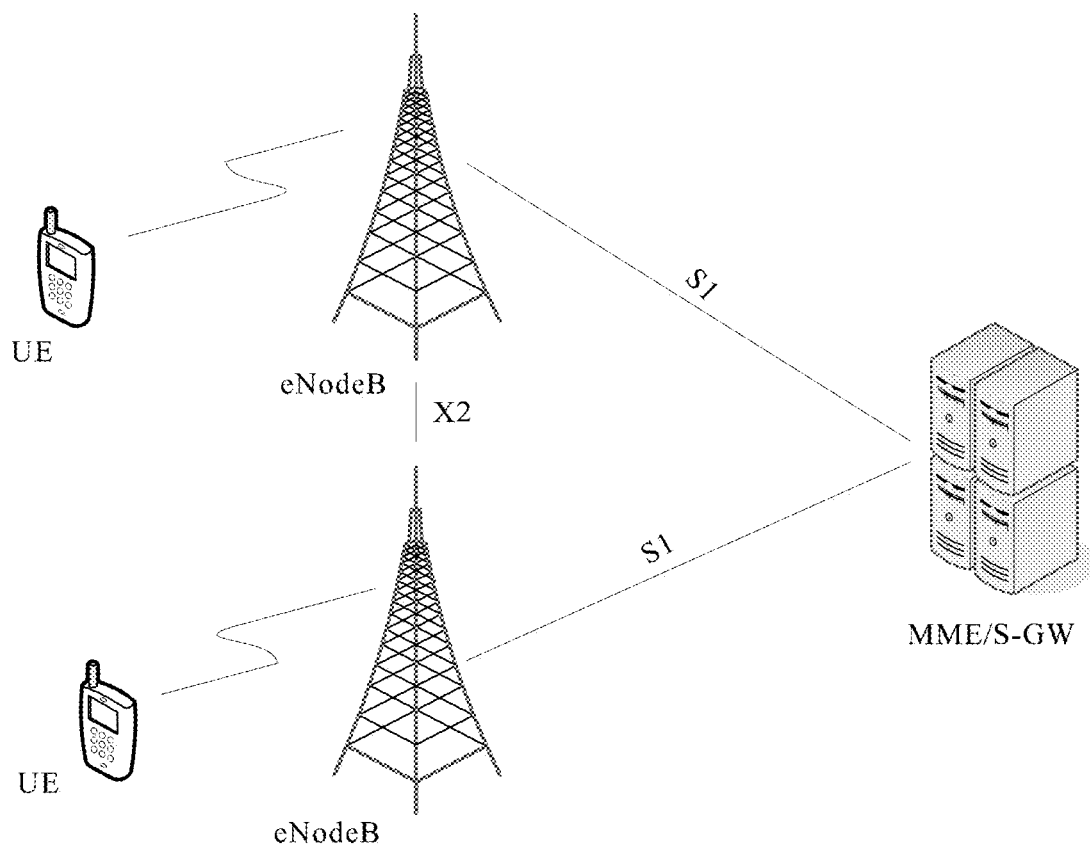
FIG. 1 is an architectural diagram of an LTE system according to an embodiment of the present application.

Using an LTE system as an example, FIG. 1 is an architectural diagram of an LTE system according to an embodiment of the present application. The LTE system has only a packet switched domain, and is divided into two network elements: an evolved packet core (EPC) and an evolved Node B (eNode B). The EPC is responsible for the part of core network, including a mobility management entity (MME) and a serving gateway (S-GW). The MME performs signaling processing, and the S-GW performs data processing. The eNode B is responsible for the part of an access network, which is also referred to as an evolved universal terrestrial radio access network (E-UTRAN). A data transmission method provided in embodiments of the present application is performed between the eNode B and a terminal.

Figure 2:
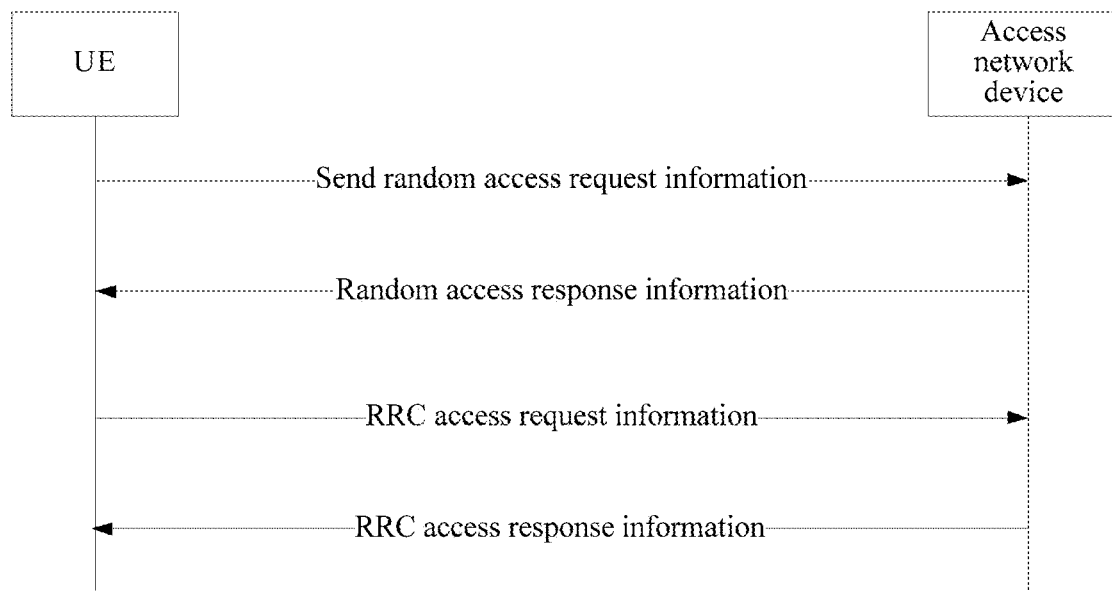
FIG. 2 is a schematic flowchart of a process in which a UE randomly accesses an access network device in the prior art.

After an existing UE receives paging information sent by an access network device, the UE establishes a radio link to the access network device in a random access manner. Using an example in which a UE establishes a radio link to an access network device in a competitive random access manner, a random access process is shown in FIG. 2. Step 1: The UE sends random access request information to the access network device first. The random access request information includes a first random preamble sequence. Step 2: The UE receives random access response information sent by the access network device. The random access response information includes an identifier used to indicate a second random preamble sequence. Step 3: If the first random preamble sequence is the same as the second random preamble sequence, the UE sends radio resource control (RRC) access request information to the access network device. Step 4: The UE receives RRC access response information sent by the access network device. Therefore, the radio link between the UE and the access network device is established, so that data transmission may be performed between the UE and the access network device. A process of establishing the radio link between the access network device and the UE is complex, and there are multiple signaling exchanges. Consequently, more network resources are occupied and data transmission efficiency is low.

The data transmission methods provided in the embodiments of the present application may be usually used in a scenario of transmitting sparse and small data packets. In this scenario, the access network device may transmit one small data packet only to the UE within a very long period, Therefore, relatively more network resources are occupied when a traditional paging method is used. However, because in the present application, a manner of directly receiving, by the UE, data sent by the access network device is used, the UE does not need to initiate a random access process. Therefore, there is a small quantity of signaling exchanges when the access network device pages the UE. In addition, if the UE does not successfully receive the data, during retransmission performed by the access network device, occupied network resources are also relatively few, so that data transmission efficiency is improved.

In addition, the access network device mentioned in the embodiments of the present application may be a hardware device that is usually used to remotely access a network resource, for example, a base station, a router, or a hub. This is not specifically limited in the embodiments of the present application.

It should be noted that the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 3:
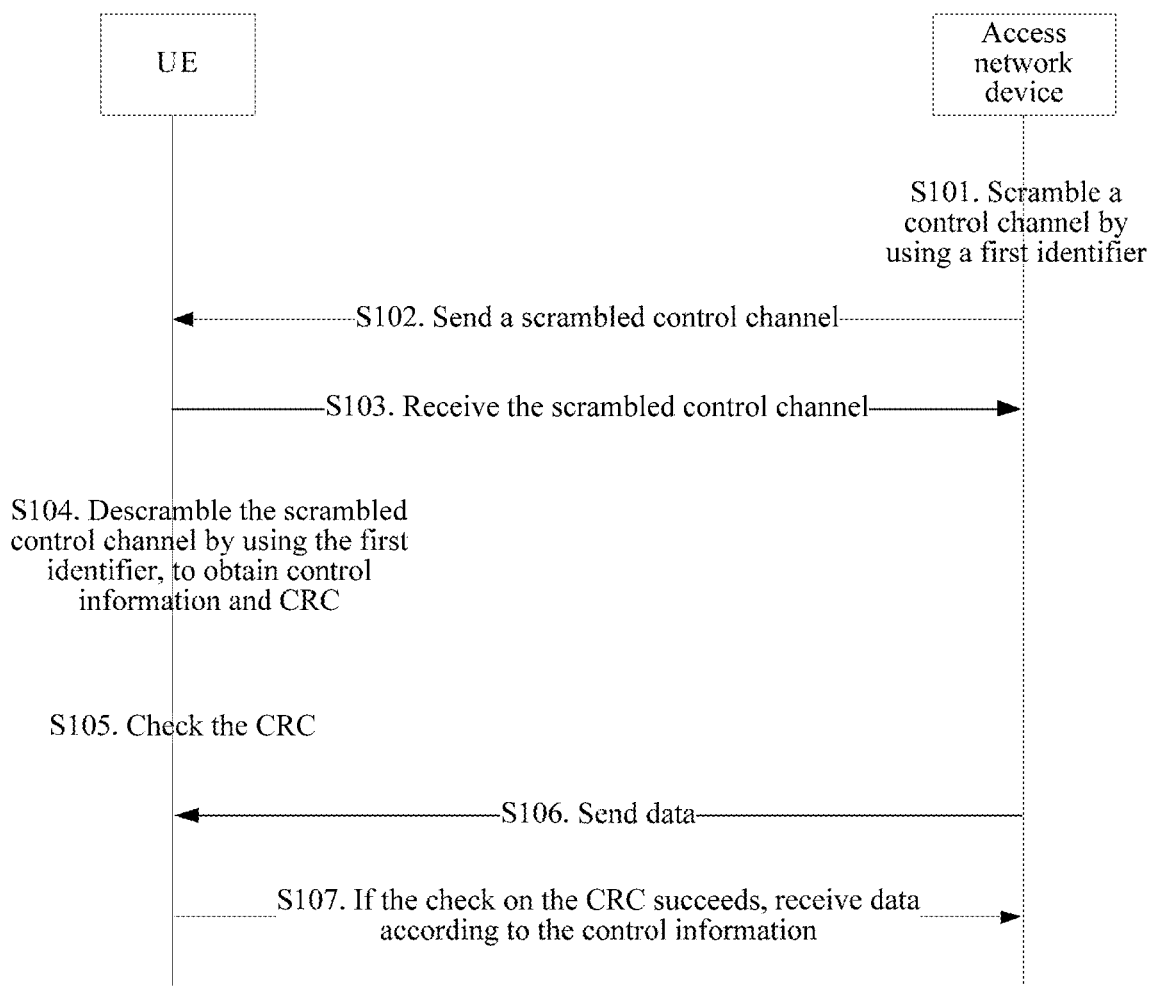
FIG. 3 is a first schematic flowchart of a data transmission method according to an embodiment of the present application.

An embodiment of the present application provides a data transmission method. As shown in FIG. 3, the data transmission method includes the following steps.

S101: An access network device scrambles a control channel by using a first identifier.

The first identifier is at least one of a higher layer identifier of a UE or a radio network temporary identifier (RNTI). The higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an Internet Protocol (IP) address of the UE. In addition, it should be noted that the higher layer identifier of the UE is not limited to the foregoing provided identifiers, and may include another higher layer identifier that can identify an identity of the UE. This is not limited in the present application.

It should be noted that the RNTI may be a cell identifier shared by multiple cells. A length of the RNTI may be greater than a length of an existing cell-level RNTI. The RNTI may be an identifier that uniquely identifies the UE in at least one cell.

A method for scrambling, by the access network device, the control channel by using the first identifier may include multiple scrambling methods. This is not limited in this embodiment of the present application. In this embodiment of the present application, three different scrambling manners are separately described below.

EXAMPLE 1

Figure 4:
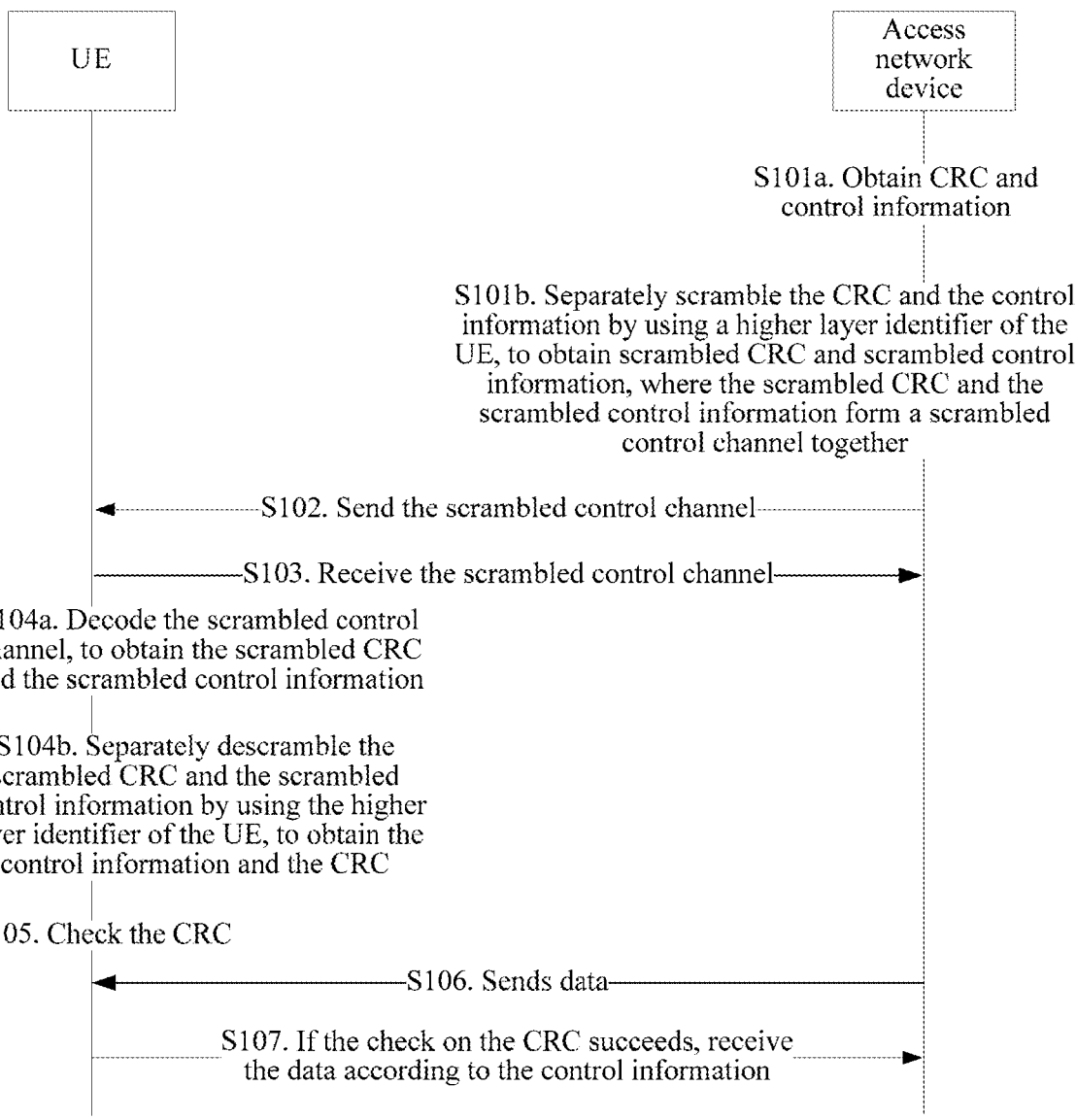
FIG. 4 is a second schematic flowchart of a data transmission method according to an embodiment of the present application.

An example in which the first identifier is the higher layer identifier of the UE is used for description. As shown in FIG. 4, step S101 of scrambling, by the access network device, the control channel by using the first identifier may include step S101a and step S101b.

S101a: The access network device obtains a cyclic redundancy code (CRC) and control information.

Specifically, the control information is usually control information of a physical downlink control channel (PDCCH). However, the control information provided in this embodiment of the present application may alternatively be control information of another control channel. This is not limited in the present application. If the control information is the control information of the PDCCH, the PDCCH channel may be independently configured by a network for the UE.

S101b: The access network device separately scrambles the CRC and the control information by using the higher layer identifier of the UE, to obtain scrambled CRC and scrambled control information, where the scrambled CRC and the scrambled control information form a scrambled control channel together.

Figure 5:
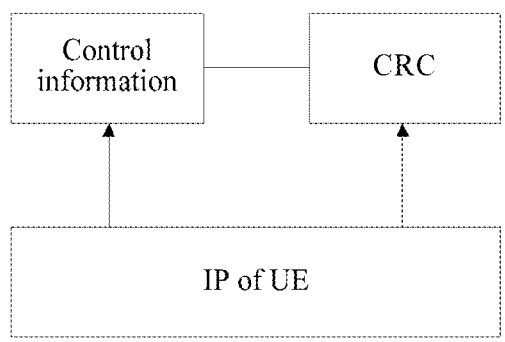
FIG. 5 is a first schematic diagram of scrambling a control channel by using a first identifier according to an embodiment of the present application.

A process of scrambling the control channel by the access network device by using the first identifier is shown in FIG. 5: First, the access network device obtains the CRC and the control information. Second, the access network device separately scrambles the CRC and the control information by using the higher layer identifier (for example, the IP of the UE shown in FIG. 5), to obtain the scrambled CRC and the scrambled control information.

Figure 6:
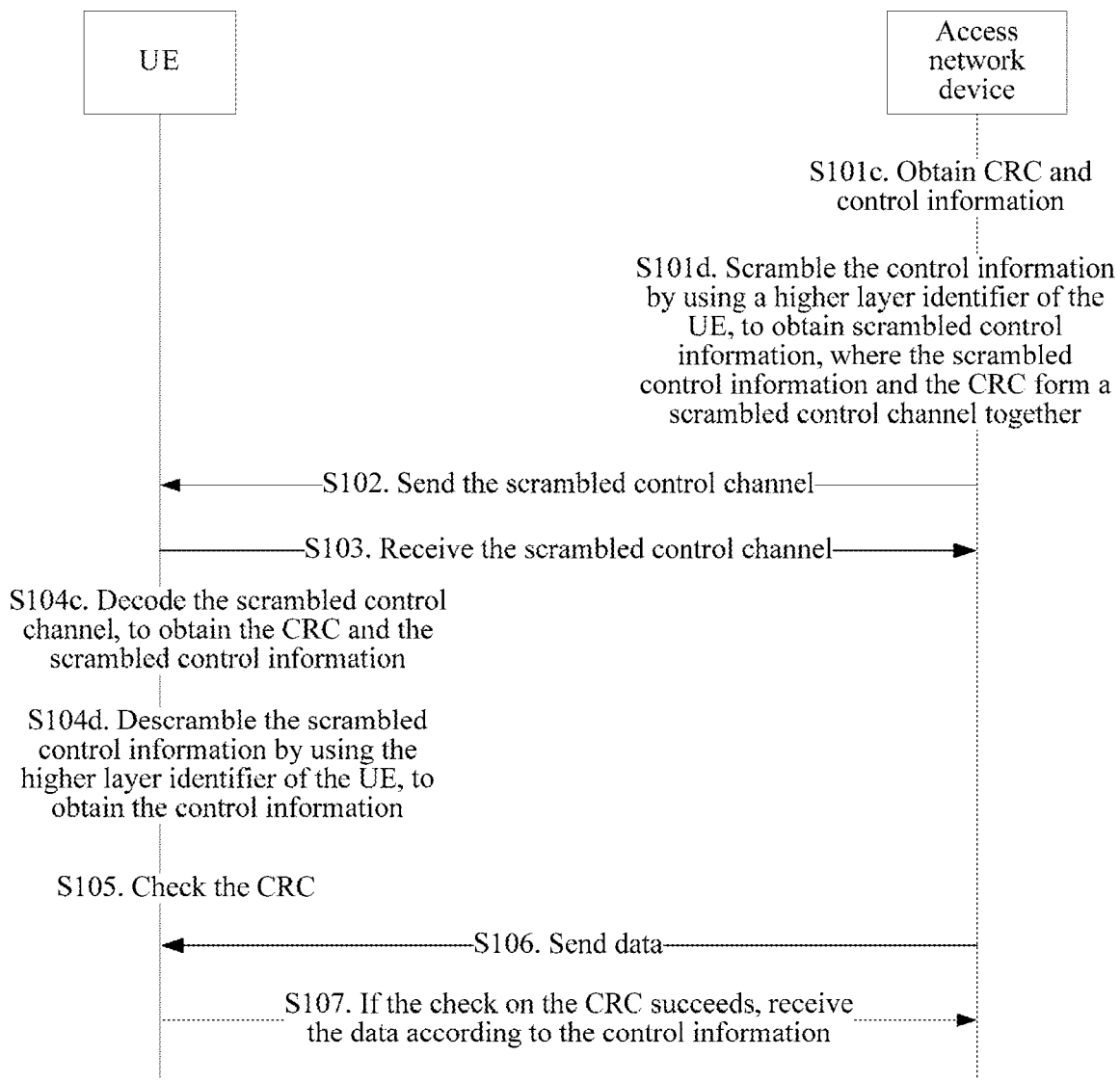
FIG. 6 is a third schematic flowchart of a data transmission method according to an embodiment of the present application.

Optionally, an example in which the first identifier is the higher layer identifier of the UE is used for description. As shown in FIG. 6, step S101 of scrambling, by the access network device, the control channel by using the first identifier may alternatively include step S101c and step S101d.

S101c: The access network device obtains the CRC and the control information.

Specifically, step S101c is the same as the foregoing step S101a, and details are not described herein again.

S101d: The access network device scrambles the control information by using the higher layer identifier of the UE, to obtain the scrambled control information, where the scrambled control information and the CRC form a scrambled control channel together.

Figure 7:
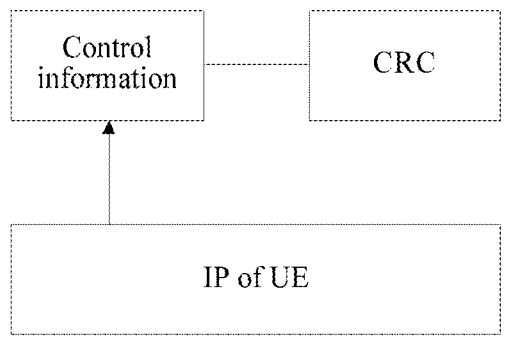
FIG. 7 is a second schematic diagram of scrambling a control channel by using a first identifier according to an embodiment of the present application.

A process of scrambling the control channel by the access network device by using the first identifier is shown in FIG. 7: First, the access network device obtains the CRC and the control information. Second, the access network device scrambles the control information by using the higher layer identifier of the UE (for example, the IP of the UE shown in FIG. 7), to obtain the scrambled control information. The scrambled control information and the CRC form the scrambled control channel together.

EXAMPLE 2

Figure 8:
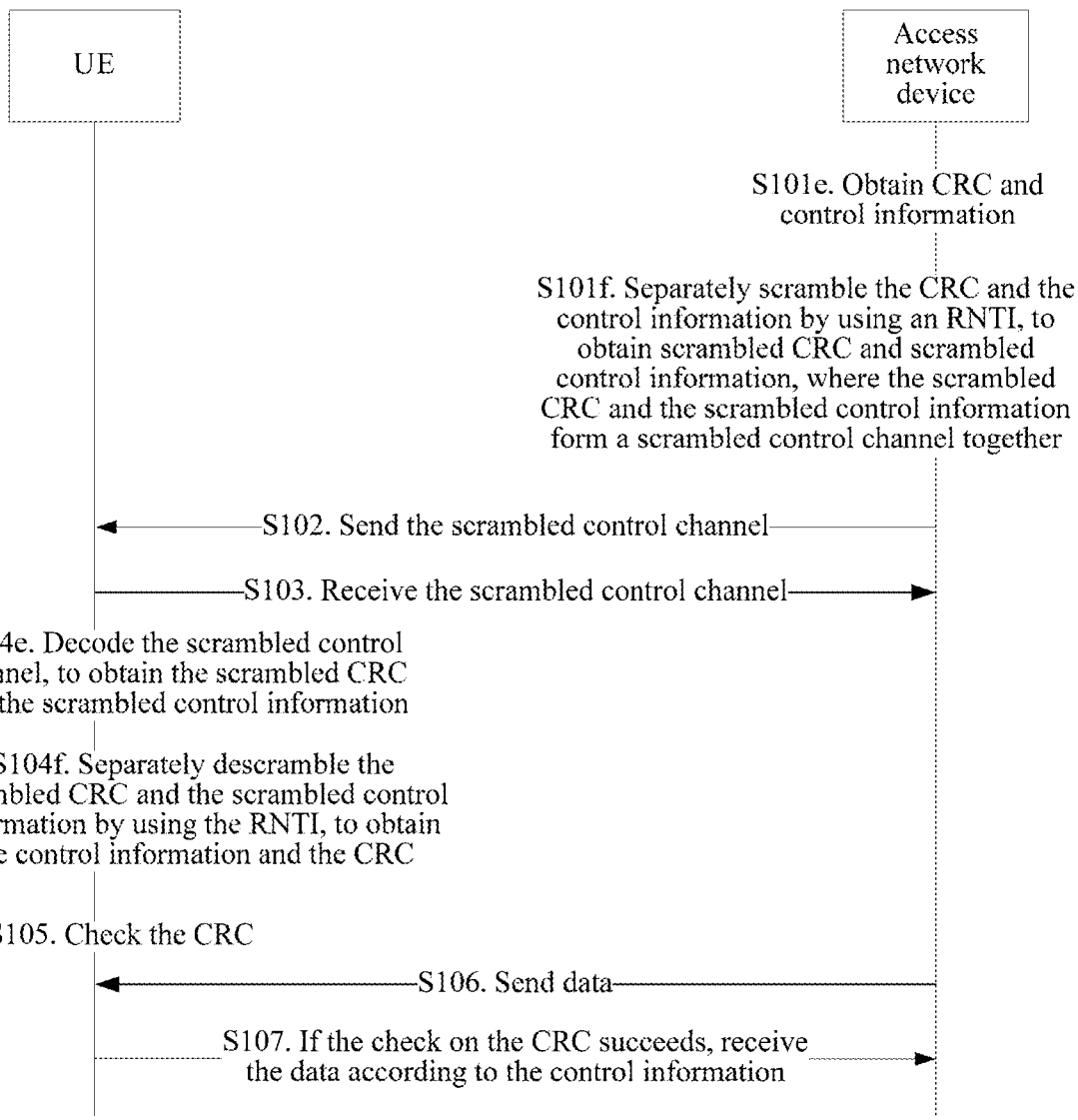
FIG. 8 is a fourth schematic flowchart of a data transmission method according to an embodiment of the present application.

An example in which the first identifier is the RNTI is used for description. As shown in FIG. 8, step S101 of scrambling, by the access network device, the control channel by using the first identifier may include step S101e and step S101f.

S101e: The access network device obtains CRC and control information.

Specifically, step S101e is the same as the foregoing step S101a, and details are not described herein again.

S101f: The access network device separately scrambles the CRC and the control information by using the RNTI, to obtain scrambled CRC and scrambled control information, where the scrambled CRC and the scrambled control information form a scrambled control channel together.

Figure 9:
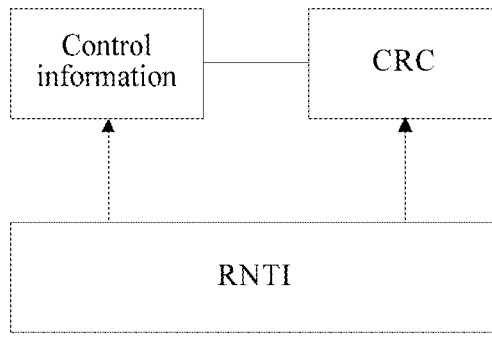
FIG. 9 is a third schematic diagram of scrambling a control channel by using a first identifier according to an embodiment of the present application.

A process of scrambling the control channel by the access network device by using the first identifier is shown in FIG. 9: First, the access network device obtains the CRC and the control information. Second, the access network device separately scrambles the CRC and the control information by using the RNTI, to obtain the scrambled CRC and the scrambled control information. The scrambled CRC and the scrambled control information form the scrambled control channel together.

Figure 10:
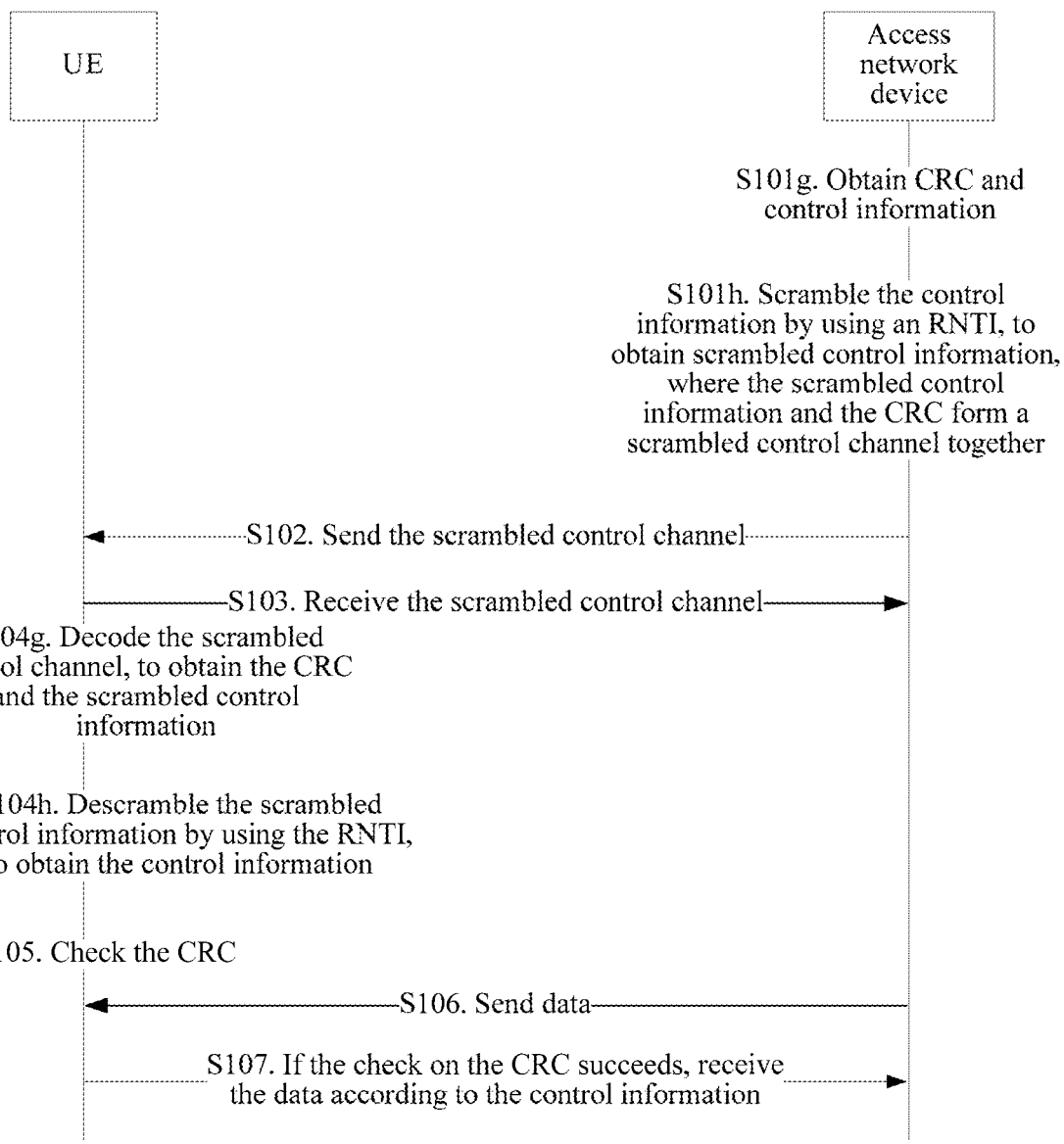
FIG. 10 is a fifth schematic flowchart of a data transmission method according to an embodiment of the present application.

Optionally, an example in which the first identifier is the RNTI is used for description. As shown in FIG. 10, step S101 of scrambling, by the access network device, the control channel by using the first identifier may alternatively include step S101g and step S101h.

S101g: The access network device obtains CRC and control information.

Specifically, step S101g is the same as the foregoing step S101a, and details are not described herein again.

S101h: The access network device scrambles the control information by using the RNTI, to obtain scrambled control information, where the scrambled control information and the CRC form a scrambled control channel together.

Figure 11:
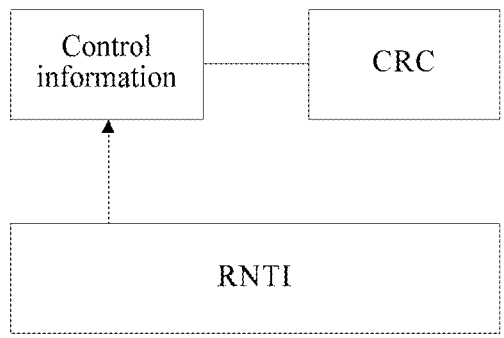
FIG. 11 is a fourth schematic diagram of scrambling a control channel by using a first identifier according to an embodiment of the present application.

A process of scrambling the control channel by the access network device by using the first identifier is shown in FIG. 11: First, the access network device obtains the CRC and the control information. Second, the access network device scrambles the control information by using the RNTI, to obtain the scrambled control information. The scrambled control information and the CRC form the scrambled control channel together.

Figure 12:
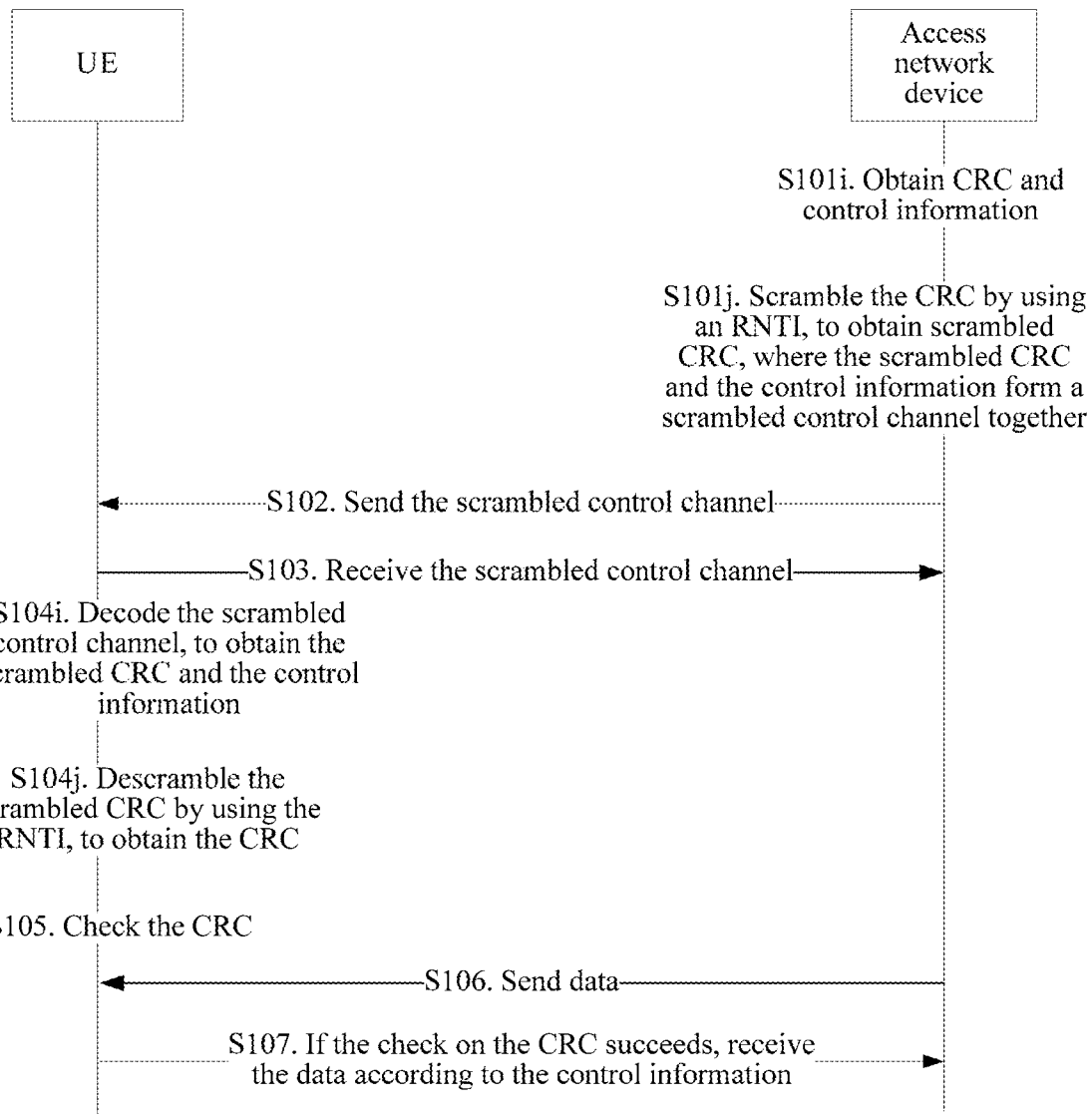
FIG. 12 is a sixth schematic flowchart of a data transmission method according to an embodiment of the present application.

Optionally, an example in which the first identifier is the RNTI is used for description. As shown in FIG. 12, step S101 of scrambling, by the access network device, the control channel by using the first identifier may alternatively include step S101i and step S101j.

S101i: The access network device obtains CRC and control information.

Specifically, step S101i is the same as the foregoing step S101a, and details are not described herein again.

S101j: The access network device scrambles the CRC by using the RNTI, to obtain scrambled CRC, where the scrambled CRC and the control information form a scrambled control channel together.

Figure 13:
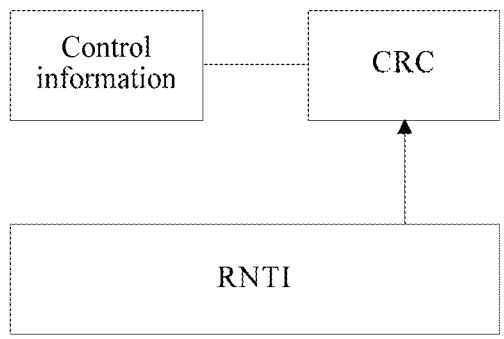
FIG. 13 is a fifth schematic diagram of scrambling a control channel by using a first identifier according to an embodiment of the present application.

A process of scrambling the control channel by the access network device by using the first identifier is shown in FIG. 13: First, the access network device obtains the CRC and the control information. Second, the access network device scrambles the CRC by using the RNTI, to obtain the scrambled CRC. The scrambled CRC and the control information form the scrambled control channel together.

EXAMPLE 3

Figure 14:
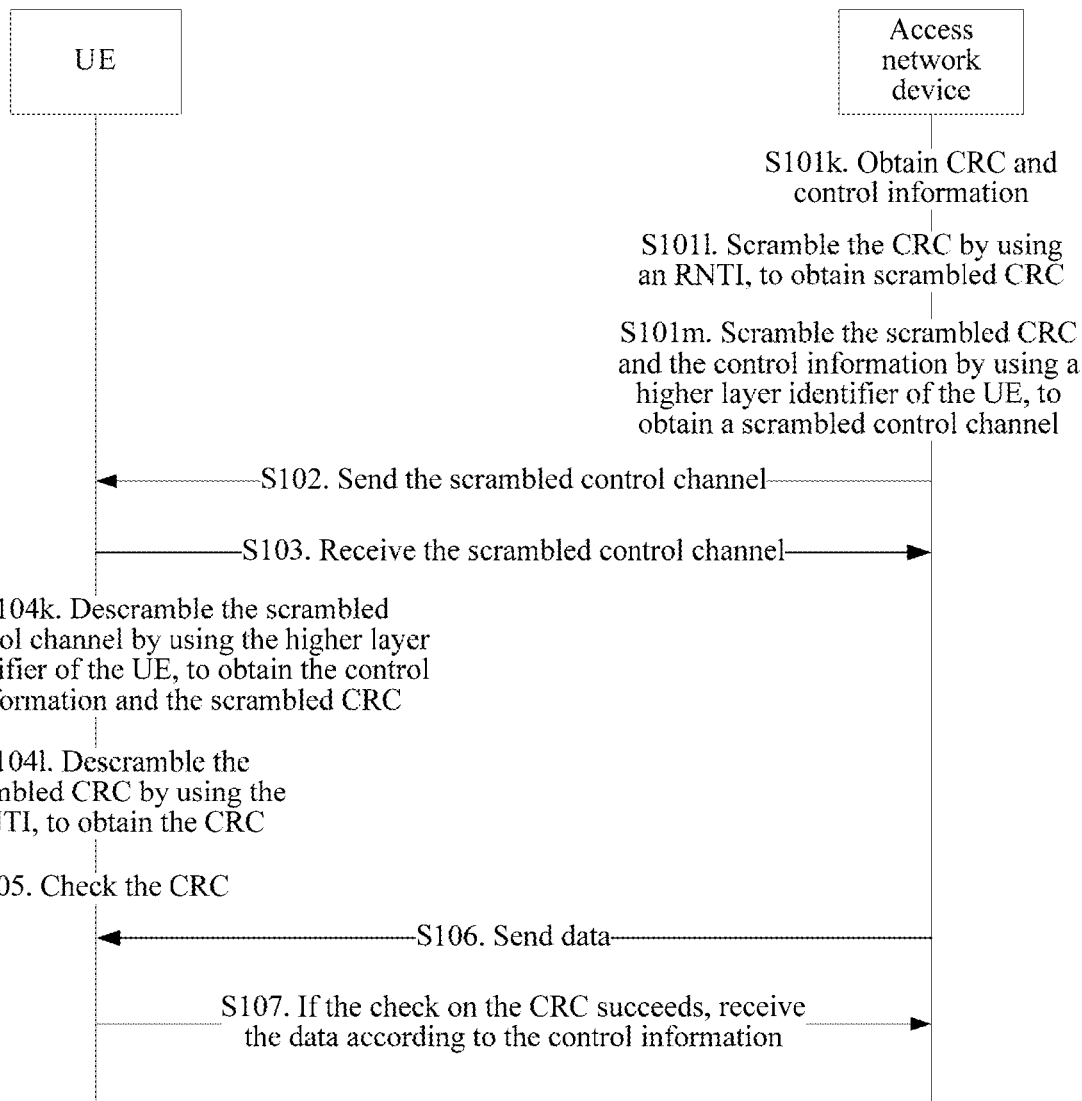
FIG. 14 is a seventh schematic flowchart of a data transmission method according to an embodiment of the present application.

An example in which the first identifier is the higher layer identifier of the UE and the RNTI is used for description. As shown in FIG. 14, step S101 of scrambling, by the access network device, the control channel by using the first identifier may include step S101k to step S101m.

S101k: The access network device obtains CRC and control information.

Specifically, step S101k is the same as the foregoing step S101a, and details are not described herein again.

S101l: The access network device scrambles the CRC by using the RNTI, to obtain scrambled CRC.

S101m: The access network device scrambles the scrambled CRC and the control information by using the higher layer identifier of the UE, to obtain a scrambled control channel.

Figure 15:
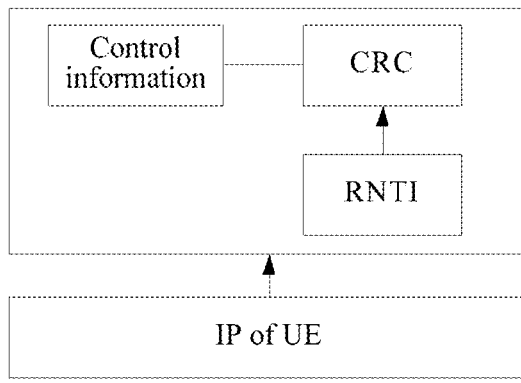
FIG. 15 is a sixth schematic diagram of scrambling a control channel by using a first identifier according to an embodiment of the present application.

A process of scrambling the control channel by the access network device by using the first identifier is shown in FIG. 15: First, the access network device obtains the CRC and the control information. Second, the access network device scrambles the CRC by using the RNTI, to obtain the scrambled CRC. Finally, the access network device scrambles the scrambled CRC and the control information by using the higher layer identifier of the UE (for example, the IP of the UE shown in FIG. 15), to obtain the scrambled control channel.

Figure 16:
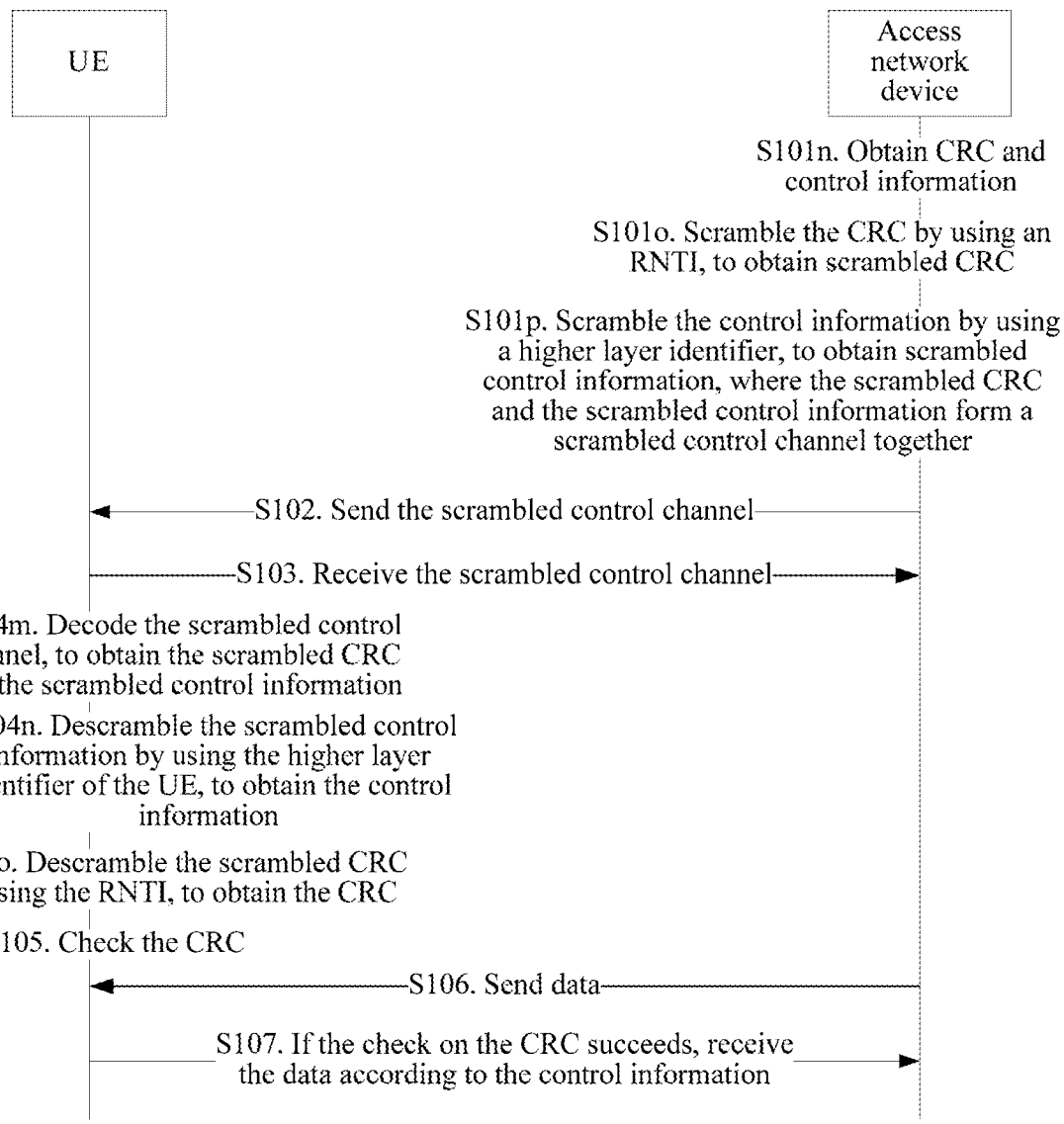
FIG. 16 is an eighth schematic flowchart of a data transmission method according to an embodiment of the present application.

Optionally, an example in which the first identifier is the higher layer identifier of the UE and the RNTI is used for description. As shown in FIG. 16, step S101 of scrambling, by the access network device, the control channel by using the first identifier may alternatively include step S101n to step S101p.

S101n: The access network device obtains CRC and control information.

Specifically, step S101n is the same as the foregoing step S101a, and details are not described herein again.

S101o: The access network device scrambles the CRC by using the RNTI, to obtain scrambled CRC.

S101p: The access network device scrambles the control information by using the higher layer identifier, to obtain scrambled control information, where the scrambled CRC and the scrambled control information form a scrambled control channel together.

Figure 17:
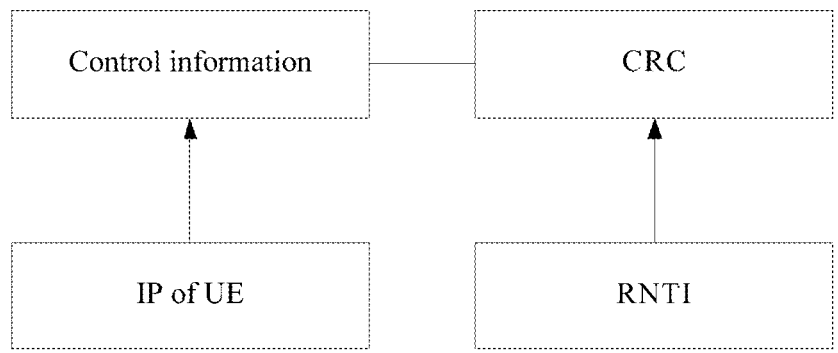
FIG. 17 is a seventh schematic diagram of scrambling a control channel by using a first identifier according to an embodiment of the present application.

A process of scrambling the control channel by the access network device by using the first identifier is shown in FIG. 17: First, the access network device obtains the CRC and the control information. Second, the access network device scrambles the CRC by using the RNTI, to obtain the scrambled CRC. Finally, the access network device scrambles the control information by using the higher layer identifier (for example, the IP of the UE shown in FIG. 17), to obtain the scrambled control information. The scrambled CRC and the scrambled control information form the scrambled control channel together.

It should be additionally noted that if a length of the CRC and a length of the control information are less than a length of the higher layer identifier of the UE, before the CRC or the control information is scrambled by using the higher layer identifier of the UE, a fixed bit may be added to make the length of the CRC and the length of the control information equal to the length of the higher layer identifier. Similarly, if the length of the control information is less than a length of an identifier for scrambling the control information, a fixed bit may be added to make the length of the control information equal to the length of the identifier for scrambling the control information; or some bits may be selected from the identifier for scrambling the control information to scramble the control information.

S102: The access network device sends the scrambled control channel to the UE.

It should be noted that when determining to send data to the UE in an idle state, a non-synchronous state, or a loose synchronous state, the access network device may schedule the UE by using the control channel. If the RNTI is carried in the control channel, the RNTI may be a special RNTI or a paging RNTI allocated by a base station to the UE. The special RNTI allocated by the base station to the UE may be configured by a network side device. One group RNTI may be configured for different UEs, or a special RNTI may be configured for one UE. A time point at which the UE monitors the PDCCH may be determined based on the higher layer identifier of the UE and the RNTI in the control channel.

S103: The UE receives the scrambled control channel sent by the access network device.

This step is a step corresponding to step S102. In step S102, the access network device sends the scrambled control channel. Correspondingly, the UE receives the scrambled control channel sent by the access network device.

S104: The UE descrambles the scrambled control channel by using the first identifier, to obtain the control information and the CRC.

The first identifier is at least one of a higher layer identifier of the UE or a radio network temporary identifier RNTI. The higher layer identifier of the UE is any one or more of an S-TMSI, an M-TMSI, an IMSI, or an IP address of the UE.

A method for descrambling, by the UE, the scrambled control channel by using the first identifier, to obtain the control information and the CRC may include multiple descrambling methods. This is not limited in this embodiment of the present application. In this embodiment of the present application, three different scrambling manners are separately described below.

EXAMPLE 1

An example in which the first identifier is the higher layer identifier of the UE is used for description. As shown in FIG. 4, step S104 of descrambling, by the UE, the scrambled control channel by using the first identifier may include step S104a and step S104b.

S104a: The UE decodes the scrambled control channel, to obtain the scrambled CRC and the scrambled control information.

S104b: The UE separately descrambles the scrambled CRC and the scrambled control information by using the higher layer identifier of the UE, to obtain the control information and the CRC.

The steps are descrambling steps corresponding to step S101a and step S101b of scrambling, by the access network device, the control channel by using the first identifier. Specifically, the steps of descrambling, by the UE, the scrambled control channel by using the first identifier are opposite to step S101a and step S101b, and details are not described herein again.

Optionally, an example in which the first identifier is the higher layer identifier of the UE is used for description. As shown in FIG. 6, step S104 of descrambling, by the UE, the scrambled control channel by using the first identifier may further include step S104c and step S104d.

S104c: The UE decodes the scrambled control channel, to obtain the CRC and the scrambled control information.

S104d: The UE descrambles the scrambled control information by using the higher layer identifier of the UE, to obtain the control information.

The steps are descrambling steps corresponding to step S101c and step S101d of scrambling, by the access network device, the control channel by using the first identifier. Specifically, the steps of descrambling, by the UE, the scrambled control channel by using the first identifier are opposite to step S101c and step S101d, and details are not described herein again.

EXAMPLE 2

An example in which the first identifier is the RNTI is used for description. As shown in FIG. 8, step S104 of descrambling, by the UE, the scrambled control channel by using the first identifier may include step S104e and step S104f.

S104e: The UE decodes the scrambled control channel, to obtain the scrambled CRC and the scrambled control information.

S104f: The UE separately descrambles the scrambled CRC and the scrambled control information by using the RNTI, to obtain the control information and the CRC.

The steps are descrambling steps corresponding to step S101e and step S101f of scrambling, by the access network device, the control channel by using the first identifier. Specifically, the steps of descrambling, by the UE, the scrambled control channel by using the first identifier are opposite to step S101e and step S101f, and details are not described herein again.

Optionally, an example in which the first identifier is the RNTI is used for description. As shown in FIG. 10, step S104 of descrambling, by the UE, the scrambled control channel by using the first identifier may include step S104g and step S104h.

S104g: The UE decodes the scrambled control channel, to obtain the CRC and the scrambled control information.

S104h: The UE descrambles the scrambled control information by using the RNTI, to obtain the control information.

The steps are descrambling steps corresponding to step S101g and step S101h of scrambling, by the access network device, the control channel by using the first identifier. Specifically, the steps of descrambling, by the UE, the scrambled control channel by using the first identifier are opposite to step S101g and step S101h, and details are not described herein again.

Optionally, an example in which the first identifier is the RNTI is used for description. As shown in FIG. 12, step S104 of descrambling, by the UE, the scrambled control channel by using the first identifier may include step S104i and step S104j.

S104i: The UE decodes the scrambled control channel, to obtain the scrambled CRC and the control information.

S104j: The UE descrambles the scrambled CRC by using the RNTI, to obtain the CRC.

The steps are descrambling steps corresponding to step S101i and step S101j of scrambling, by the access network device, the control channel by using the first identifier. Specifically, the steps of descrambling, by the UE, the scrambled control channel by using the first identifier are opposite to step S101i and step S101j, and details are not described herein again.

For the foregoing case in which the first identifier is the RNTI, it should be noted that if the RNTI is greater than 16 bits, an effective area of the RNTI may be one or more access network devices. A part of the RNTI is used to scramble the CRC, and another part is used to scramble the control information. If the RNTI is less than or equal to 16 bits, after the descrambling, the UE is not sure whether the data is the data sent by the access network device to the UE. The UE needs to decode higher layer data to obtain a higher layer identifier of the UE, so as to determine whether the data is the data sent by the access network device to the UE. If yes, a feedback may be sent to the network by using a physical layer signaling or an upper layer signaling, and the feedback may carry a unique identifier of the UE. The identifier may be a higher layer identifier of the UE or an RNTI allocated by the access network device to the UE.

EXAMPLE 3

An example in which the first identifier is the higher layer identifier of the UE and the RNTI is used for description. As shown in FIG. 14, step S104 of descrambling, by the UE, the scrambled control channel by using the first identifier may include step S104k and step S104l.

S104k: The UE descrambles the scrambled control channel by using the higher layer identifier of the UE, to obtain the control information and the scrambled CRC.

S104l: The UE descrambles the scrambled CRC by using the RNTI, to obtain the CRC.

The steps are descrambling steps corresponding to step S101k to step S101m of scrambling, by the access network device, the control channel by using the first identifier. Specifically, the steps of descrambling, by the UE, the scrambled control channel by using the first identifier are opposite to step S101k to step S101m, and details are not described herein again.

Optionally, an example in which the first identifier is the higher layer identifier of the UE and the RNTI is used for description. As shown in FIG. 16, step S104 of descrambling, by the UE, the scrambled control channel by using the first identifier may include step S104*m* to step S104*o*.

S104*m*: The UE decodes the scrambled control channel, to obtain the scrambled CRC and the scrambled control information.

S104*n*: The UE descrambles the scrambled control information by using the higher layer identifier of the UE, to obtain the control information.

S104*o*: The UE descrambles the scrambled CRC by using the RNTI, to obtain the CRC.

The steps are descrambling steps corresponding to step S101*n* to step S101*p* of scrambling, by the access network device, the control channel by using the first identifier. Specifically, the steps of descrambling, by the UE, the scrambled control channel by using the first identifier are opposite to step S101*n* to step S101*p*, and details are not described herein again.

S105: The UE checks the CRC.

It should be noted that the CRC is common error check code in the field of data communications, and the CRC is characterized in that a length of an information field and a length of a check field may be randomly set. A CRC check is a data transmission error detection function. The access network device performs polynomial calculation on data, and attaches an obtained result after a frame. After receiving the CRC, the UE performs same calculation on the data to detect whether the CRC is correct, so as to ensure correctness and integrity of data transmission. A process of the checking, by the UE, the CRC is a process of detecting whether the CRC is correct to determine correctness and integrity of the data transmission.

S106: The access network device sends data to the UE.

It should be noted that step S106 and step S103 to step S105 have no execution order. In this embodiment of the present application, step S106 may be performed first and then step S103 to step S105 are performed; or step S103 to step S105 may be performed first and then step S106 is performed. This is not limited in the present application. Specifically, in the accompany drawings provided in the present application, descriptions are made according to performing step S103 to step S105 first and then performing step S106.

S107: If the check on the CRC succeeds, the UE receives, according to the control information, the data sent by the access network device.

If the check on the CRC succeeds, the UE receives, according to the control information, the data sent by the access network device. This manner is different from an existing method in which the access network device initiates paging to the UE, so that the UE chooses to establish a radio link to the access network device in a random access manner. Therefore, signaling exchanges between the access network device and the UE can be reduced, thereby saving network resources and improving data efficiency.

Figure 18:
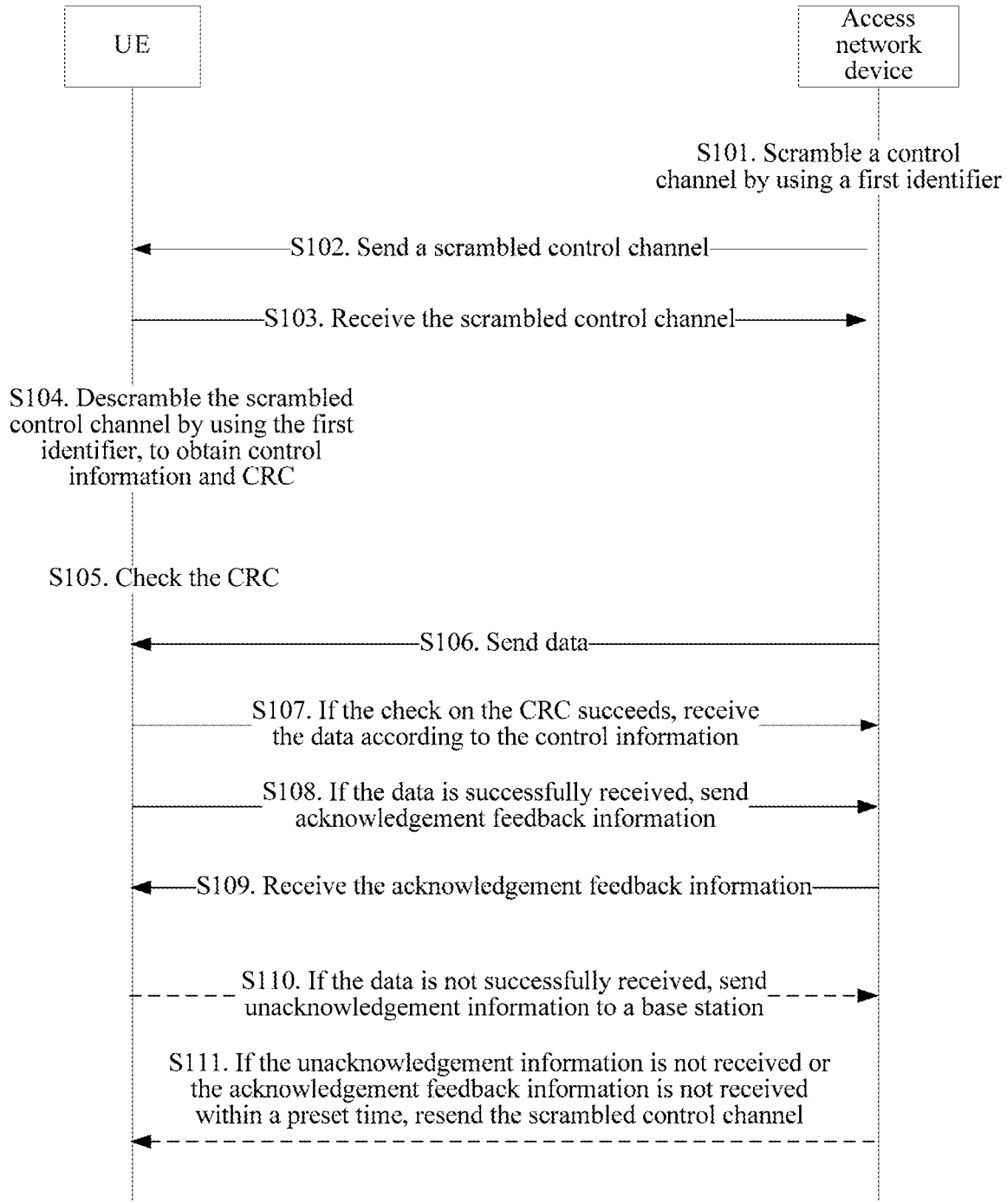
FIG. 18 is a ninth schematic flowchart of a data transmission method according to an embodiment of the present application.

Further, as shown in FIG. 18, the data transmission method provided in this embodiment of the present application may further include step S108 to step S111. It should be noted that step S108, step S109, step S110, and step S111 are steps performed after it is determined whether the UE successfully receives the data sent by the access network device. If step S108 and step S109 are already performed, in this embodiment of the present application, step S110 and step S111 are not performed any more. If step S110 and step S111 are already performed, in this embodiment of the present application, step S108 and step S109 are not performed any more.

S108: If successfully receiving the data sent by the access network device, the UE sends acknowledgement feedback information to the access network device.

A resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource. A feedback timing of the acknowledgement feedback information is preset or is indicated by the downlink scheduling. The feedback timing is a fixed time period after the UE receives the data sent by the access network device and before the UE sends the acknowledgement feedback information to the access network device.

Specifically, the UE receives the data sent by the access network device, and sends the acknowledgement feedback information to the access network device. Feedback information may be sent by being carried in physical layer signaling or higher layer signaling. The feedback information may be one or a combination of multiple of acknowledgement information, an acknowledgement bit, or identifier information of the UE. A time point at which the UE sends the acknowledgement feedback information may be a fixed delay after the UE receives the data sent by the access network device, for example, a delay greater than a transmission time interval (TTI). The UE can use a physical layer signaling feedback manner only when the access network device can uniquely determine a user according to the feedback time or a feedback resource.

Further, in a non-synchronous state, the UE may send the feedback information in a long cyclic prefix (CP) manner, a filter bank multicarrier (FBMC) manner, or a filter orthogonal frequency division multiplexing technology (F-OFDM) manner.

S109: The access network device receives the acknowledgement feedback information sent by the UE.

A resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource. A feedback timing of the acknowledgement feedback information is preset or is indicated by the downlink scheduling.

This step is a step corresponding to step S108. In step S108, the UE sends the acknowledgement feedback information. Correspondingly, the access network device receives the acknowledgement feedback information sent by the UE.

S110: If the UE does not successfully receive the data sent by the access network device, the UE sends unacknowledgement information to the access network device.

It should be noted that if the UE does not successfully receive the data sent by the access network device, that is, a data channel is failed to be decoded when the UE receives the data sent by the access network device, the UE sends the unacknowledgement information to the access network device, so that the access network device initiates retransmission, that is, the access network device resends the scrambled control information to the UE, and the UE may store a data part for combination of next HARQ (hybrid automatic repeat request) retransmission.

Specifically, the unacknowledgement information sent by the UE may be NAK (negative acknowledgement) information.

S111: If the access network device receives the unacknowledgement information sent by the UE or the access network device does not receive, within a preset time, the acknowledgement feedback information sent by the UE, the access network device resends the scrambled control channel to the UE.

This step is a step corresponding to step S110. In step S110, the UE sends the unacknowledgement information. Correspondingly, the access network device receives the unacknowledgement information sent by the UE.

If the access network device receives the unacknowledgement information sent by the UE or the access network device does not receive, within the preset time, the acknowledgement feedback information sent by the UE, the access network device initiates retransmission, that is, the access network device resends the control channel to the UE.

It should be noted that a case in which the access network device does not receive, within the preset time, the acknowledgement feedback information sent by the UE may be a case in which the access network device cannot receive the acknowledgement feedback information sent by the UE, such as a case in which an error occurs when the access network device sends the data to the UE.

It should be additionally noted that the data sent by the access network device to the UE may also be scrambled, and the data may be scrambled by using the method for scrambling the control channel by the access network device provided in this embodiment of the present application, and details are not described herein again.

If the data sent by the access network device to the UE is scrambled, the access network device may directly send scrambled data to the UE without sending the scrambled control channel to the UE. Specifically, an access network indicates resource information of a downlink data channel and a corresponding modulation and coding scheme to the UE. The UE determines receiving timing according to the higher layer identifier of the UE and/or discontinuously received configuration parameters, receives the data on a resource of the downlink data channel indicated by the access network device, and sends the acknowledgement feedback information to the access network device.

Specifically, the resource information of the downlink data channel may be sent by the access network device to the UE by means of broadcasting or by using dedicated signaling or configuration information before the access network device sends the data to the UE. The UE receives and stores the resource information of the downlink data channel. After receiving the data sent by the access network device, the UE can select one piece of the stored resource information of the downlink data channel, and send the acknowledgement feedback information to the access network device by using the piece of the resource information of the downlink data channel.

Optionally, for a manner of scrambling the data by the access network device, refer to a manner of scrambling the control channel by the access network device by using the first identifier in step S101, and details are not described herein again.

Optionally, the first identifier used to scramble the data may be sent to the UE as a part of a media access control layer protocol data unit (Media Access Control Protocol Data Unit, MAC PDU) with the data, so that the UE determines, according to the first identifier, whether the data is sent to the UE.

Specifically, a resource for sending the acknowledgement feedback information may be an uplink resource mapped according to a downlink resource, a fixed uplink feedback resource, a mapped resource determined according to the RNTI, or a mapped resource determined according to a physical downlink shared channel resource.

Further, a feedback timing of the acknowledgement feedback information is preset or is indicated by downlink scheduling.

The embodiments of the present application provide the data transmission method, the device, and the system. The user equipment UE receives the scrambled control channel, the UE descrambles the scrambled control channel by using the first identifier, to obtain the control information and the cyclic redundancy code CRC, and if the check on the CRC succeeds after the UE completes the check on the CRC, the UE receives, according to the control information, the data sent by the access network device. Based on descriptions of the foregoing embodiments, compared with a traditional process of establishing a radio link between an access network device and a UE, in the data transmission method provided in the embodiments of the present application, the UE does not need to initiate a random access process, so that a small quantity of signaling exchanges are required when the access network device pages the UE, thereby saving network resources and improving data transmission efficiency.

Figure 19:
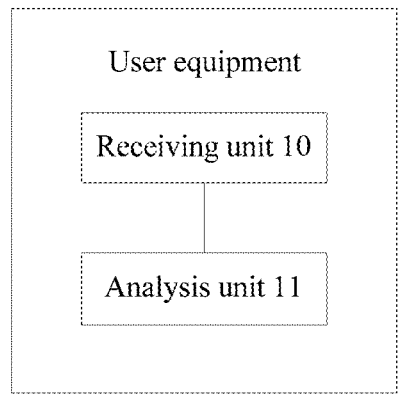
FIG. 19 is a first schematic structural diagram of a user equipment according to an embodiment of the present application.

An embodiment of the present application provides a user equipment. As shown in FIG. 19, the user equipment is configured to perform steps performed by the user equipment in the foregoing methods. The user equipment may include units corresponding to corresponding steps. For example, the user equipment may include a receiving unit 10 and an analysis unit 11.

The receiving unit 10 is configured to receive a scrambled control channel.

The analysis unit 11 is configured to: after the receiving unit 10 receives the scrambled control channel, descramble the scrambled control channel by using a first identifier, to obtain control information and cyclic redundancy code CRC and complete a check on the CRC.

The receiving unit 10 is further configured to: after the analysis unit 11 completes the check on the CRC, receive, according to the control information, data sent by an access network device.

Optionally, the first identifier is at least one of a higher layer identifier of the UE or a radio network temporary identifier RNTI.

Optionally, the higher layer identifier of the UE is any one or more of a system architecture evolution-temporary mobile subscriber identity S-TMSI, a mobility management entity-temporary mobile subscriber identity M-TMSI, an international mobile subscriber identity IMSI, or an Internet Protocol IP address of the UE.

Optionally, when the first identifier is the higher layer identifier of the UE, the analysis unit 11 is specifically configured to: decode the scrambled control channel to obtain scrambled CRC and scrambled control information, and separately descramble the scrambled CRC and the scrambled control information by using the higher layer identifier of the UE to obtain the control information and the CRC; or decode the scrambled control channel to obtain the CRC and scrambled control information, and descramble the scrambled control information by using the higher layer identifier of the UE to obtain the control information.

Optionally, when the first identifier is the RNTI, the analysis unit 11 is specifically configured to: decode the scrambled control channel to obtain scrambled CRC and scrambled control information, and separately descramble the scrambled CRC and the scrambled control information by using the RNTI to obtain the control information and the CRC; or decode the scrambled control channel to obtain the CRC and scrambled control information, and descramble the scrambled control information by using the RNTI to obtain the control information; or decode the scrambled control channel to obtain scrambled CRC and the control information, and descramble the scrambled CRC by using the RNTI to obtain the CRC.

Optionally, when the first identifier is the higher layer identifier of the UE and the RNTI, the analysis unit 11 is specifically configured to: descramble the scrambled control channel by using the higher layer identifier of the UE to obtain the control information and scrambled CRC, and descramble the scrambled CRC by using the RNTI to obtain the CRC; or decode the scrambled control channel to obtain scrambled CRC and scrambled control information, descramble the scrambled control information by using the higher layer identifier of the UE to obtain the control information, and descramble the scrambled CRC by using the RNTI to obtain the CRC.

Figure 20:
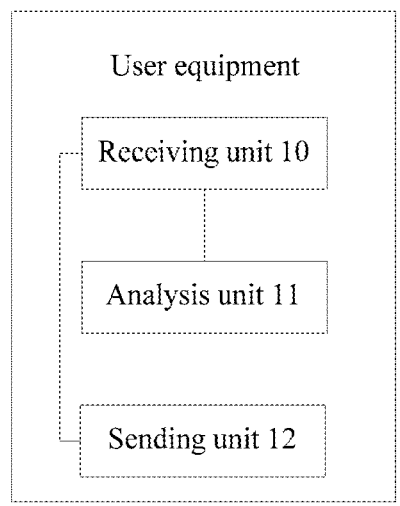
FIG. 20 is a second schematic structural diagram of a user equipment according to an embodiment of the present application.

Optionally, as shown in FIG. 20, the user equipment further includes a sending unit 12.

The sending unit 12 is configured to: after the receiving unit 10 receives, according to the control information, the data sent by the access network device, send acknowledgement feedback information to the access network device, where a resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource; and a feedback timing of the acknowledgement feedback information is preset or is indicated by the downlink scheduling.

Optionally, if the receiving unit 10 does not successfully receive the data sent by the access network device, the user equipment further includes a sending unit 12.

The sending unit 12 is configured to send unacknowledgement information to the access network device.

It may be understood that the user equipment in this embodiment may be a user equipment served by a cell under the foregoing access network device or another access network device. The user equipment may correspond to the user equipment in the data transmission method in the embodiment according to any one of FIGS. 3, 4, 6, 8, 10, 12, 14, 16, or 18. In addition, division and/or functions, and the like of the units in the user equipment in this embodiment are intended to implement the method procedure shown in any one of FIGS. 3, 4, 6, 8, 10, 12, 14, 16, or 18. For brevity, details are not described herein again.

Optionally, in another embodiment of the present application, a function of the receiving unit 10 may be implemented by a receiver, a function of the analysis unit 11 may be implemented by a processor, and a function of the sending unit 12 may be implemented by a transmitter. The receiver and the transmitter may be integrated into one transceiver.

This embodiment of the present application provides the user equipment. Based on descriptions of the foregoing embodiments, compared with a traditional process of establishing a radio link between an access network device and a UE, in the data transmission method provided in the embodiments of the present application, the UE does not need to initiate a random access process, so that signaling exchanges between the access network device and the UE are reduced, thereby saving network resources and improving data transmission efficiency.

Figure 21:
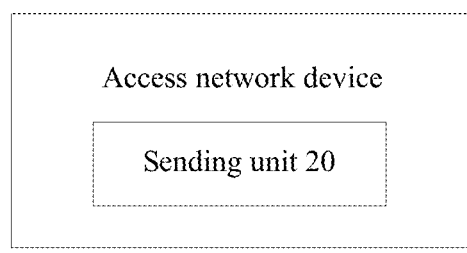
FIG. 21 is a first schematic structural diagram of an access network device according to an embodiment of the present application.

An embodiment of the present application provides an access network device. As shown in FIG. 21, the access network device is configured to perform steps performed by the access network device in the foregoing method. The access network device may include units corresponding to corresponding steps. For example, the access network device includes a sending unit 20.

The sending unit 20 is configured to send a scrambled control channel to a user equipment UE, where the scrambled control channel is scrambled by the access network device by using a first identifier.

The sending unit 20 is further configured to send data to the UE.

Optionally, the first identifier is at least one of a higher layer identifier of the UE or a radio network temporary identifier RNTI.

Optionally, the higher layer identifier of the UE is any one or more of a system architecture evolution-temporary mobile subscriber identity S-TMSI, a mobility management entity-temporary mobile subscriber identity M-TMSI, an international mobile subscriber identity IMSI, or an Internet Protocol IP address of the UE.

Figure 22:
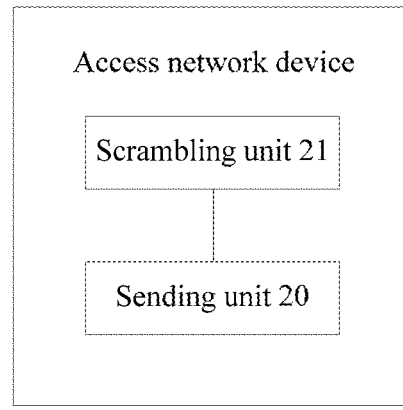
FIG. 22 is a second schematic structural diagram of an access network device according to an embodiment of the present application.

Optionally, as shown in FIG. 22, the access network device further includes a scrambling unit 21.

The scrambling unit 21 is configured to: before the sending unit 20 sends the scrambled control channel to the UE, scramble a control channel by using the first identifier.

Optionally, when the first identifier is the higher layer identifier of the UE, the scrambling unit 21 is specifically configured to: obtain CRC and control information, and separately scramble the CRC and the control information by using the higher layer identifier of the UE to obtain scrambled CRC and scrambled control information, where the scrambled CRC and the scrambled control information form the scrambled control channel together; or obtain CRC and control information, and scramble the control information by using the higher layer identifier of the UE to obtain scrambled control information, where the scrambled control information and the CRC form the scrambled control channel together.

Optionally, when the first identifier is the RNTI, the scrambling unit 21 is specifically configured to: obtain CRC and control information, and separately scramble the CRC and the control information by using the RNTI to obtain scrambled CRC and scrambled control information, where the scrambled CRC and the scrambled control information form the scrambled control channel together; or obtain CRC and control information, and scramble the control information by using the RNTI to obtain scrambled control information, where the scrambled control information and the CRC form the scrambled control channel together; or obtain CRC and control information, and scramble the CRC by using the RNTI to obtain scrambled CRC, where the scrambled CRC and the control information form the scrambled control channel together.

Optionally, when the first identifier is the higher layer identifier of the UE and the RNTI, the scrambling unit 21 is specifically configured to: obtain CRC and control information, scramble the CRC by using the RNTI to obtain scrambled CRC, and scramble the scrambled CRC and the control information by using the higher layer identifier of the UE to obtain the scrambled control channel; or obtain CRC and control information, scramble the CRC by using the RNTI to obtain scrambled CRC, and scramble the control information by using the higher layer identifier to obtain scrambled control information, where the scrambled CRC and the scrambled control information form the scrambled control channel together.

Figure 23:
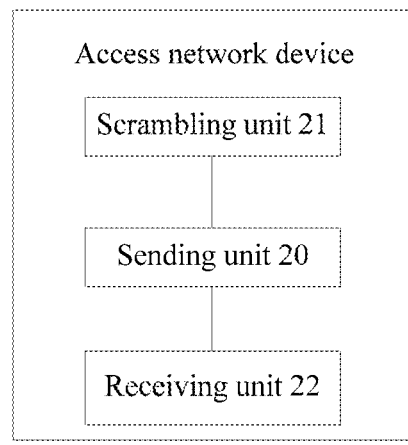
FIG. 23 is a third schematic structural diagram of an access network device according to an embodiment of the present application.

Optionally, as shown in FIG. 23, the access network device further includes a receiving unit 22.

The receiving unit 22 is configured to: after the sending unit 20 sends the data to the UE, receive acknowledgement feedback information sent by the UE, where a resource for sending the acknowledgement feedback information is a physical uplink control channel resource allocated in downlink scheduling, a physical uplink shared channel resource allocated in the downlink scheduling, a mapped resource determined according to the RNTI, or a mapped resource determined according to a physical downlink control channel resource; and a feedback timing of the acknowledgement feedback information is preset or is indicated by the downlink scheduling.

Optionally, the sending unit 20 is further configured to: if the receiving unit 22 receives unacknowledgement information sent by the UE or does not receive, within a preset time, the acknowledgement feedback information sent by the UE, resend the scrambled control channel to the UE.

It may be understood that the access network device in this embodiment may be an access network device accessed by the foregoing user equipment. The access network device may correspond to the access network device in the data transmission method in the embodiment according to any one of FIGS. 3, 4, 6, 8, 10, 12, 14, 16, or 18. In addition, division and/or functions, and the like of the units in the access network device in this embodiment are intended to implement the method procedure shown in any one of FIGS. 3, 4, 6, 8, 10, 12, 14, 16, or 18. For brevity, details are not described herein again.

Optionally, in another embodiment of the present application, a function of the sending unit 20 may be implemented by a transmitter, a function of the scrambling unit 21 may be implemented by a processor, and a function of the receiving unit 22 may be implemented by a receiver. The receiver and the transmitter may be integrated into one transceiver.

This embodiment of the present application provides the access network device. Based on descriptions of the foregoing embodiments, compared with a traditional process of establishing a radio link between an access network device and a UE, in the data transmission method provided in the embodiments of the present application, the UE does not need to initiate a random access process, so that signaling exchanges between the access network device and the UE are reduced, thereby saving network resources and improving data transmission efficiency.

Figure 24:
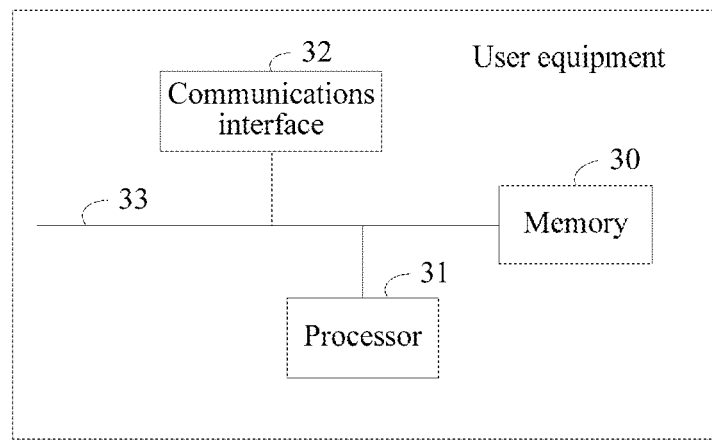
FIG. 24 is a schematic diagram of hardware of a user equipment according to an embodiment of the present application.

An embodiment of the present application further provides a user equipment. As shown in FIG. 24, the terminal includes: a memory 30, a processor 31, a communications interface 32, and a system bus 33.

The memory 30, the processor 31, and the communications interface 32 are connected by using the system bus 33, the memory 30 is configured to store some computer instructions, and the processor 31 is configured to execute the computer instructions, so that the user equipment performs the data transmission method according to any one of FIGS. 3, 4, 6, 8, 10, 12, 14, 16, or 18. For a specific data transmission method, refer to a related description in the embodiment shown in any one of FIGS. 3, 4, 6, 8, 10, 12, 14, 16, or 18, and details are not described herein again.

The processor 31 may be a central processing unit (CPU). The processor 31 may alternatively be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may alternatively be any conventional processor or the like.

The processor 31 may be a dedicated processor, and the dedicated processor may include at least one of a baseband processing chip, a radio frequency processing chip, or the like. Further, the dedicated processor may further include a chip having another dedicated processing function of the user equipment.

The memory 30 may include a volatile memory, for example, a random access memory (RAM). The memory 30 may alternatively include a non-volatile memory, for example, a read-only memory (ROM), a flash memory, a hard disk drive (HDD), or a solid-state drive (SSD). The memory 30 may alternatively include a combination of the foregoing memories.

The system bus 33 may include a data bus, a power bus, a control bus, a signal status bus, and the like. In this embodiment, for a purpose of clear description, all buses are marked as the system bus 33 in FIG. 24.

The communications interface 32 may include a receiver and a transmitter. In addition, in a specific implementation of the user equipment, the receiver and the transmitter may be specifically a transceiver of the user equipment. The transceiver may be a wireless transceiver. For example, the wireless transceiver may be an antenna of the user equipment or the like. The processor 31 sends and receives data with another device such as an access network device by using the transceiver.

In a specific implementation process, all steps of the method procedure shown in any one of FIGS. 3, 4, 6, 8, 10, 12, 14, 16, or 18 can be implemented by using a computer executable instruction in a form of hardware executing software. To avoid repetition, details are not described herein again.

This embodiment of the present application provides the user equipment. Based on descriptions of the foregoing embodiments, compared with a traditional process of establishing a radio link between an access network device and a UE, in the data transmission method provided in the embodiments of the present application, the UE does not need to initiate a random access process, so that signaling exchanges between the access network device and the UE are reduced, thereby saving network resources and improving data transmission efficiency.

Figure 25:
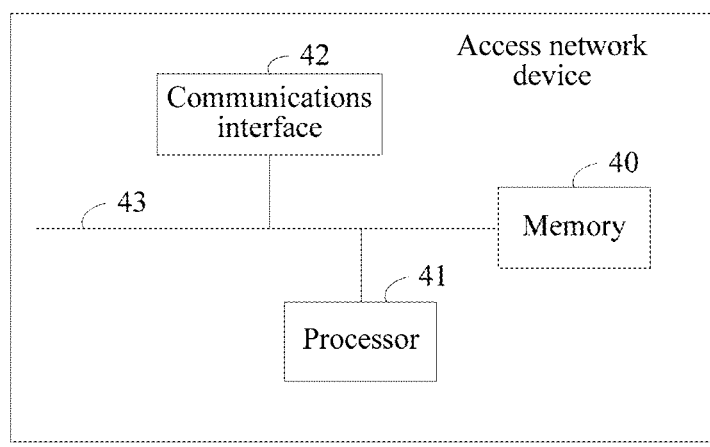
FIG. 25 is a schematic diagram of hardware of an access network device according to an embodiment of the present application.

An embodiment of the present application provides an access network device. As shown in FIG. 25, the terminal includes: a memory 40, a processor 41, a communications interface 42, and a system bus 43.

The memory 40, the processor 41, and the communications interface 42 are connected by using the system bus 43, the memory 40 is configured to store some computer instructions, and the processor 41 is configured to execute the computer instructions, so that the access network device performs the data transmission method according to any one of FIGS. 3, 4, 6, 8, 10, 12, 14, 16, or 18. For a specific data transmission method, refer to a related description in the embodiment shown in any one of FIGS. 3, 4, 6, 8, 10, 12, 14, 16, or 18, and details are not described herein again.

The processor 41 may be a CPU. The processor 41 may alternatively be another general purpose processor, a DSP, an ASIC, an FPGA or another programmable logic device, a discrete gate or a transistor logic device, or a discrete hardware component, or the like. The general purpose processor may be a microprocessor, or the processor may alternatively be any conventional processor or the like.

The processor 41 may be a dedicated processor, and the dedicated processor may include at least one of a baseband processing chip, a radio frequency processing chip, or the like. Further, the dedicated processor may further include a chip having another dedicated processing function of the user equipment.

The memory 40 may include a volatile memory, for example, a RAM. The memory 40 may alternatively include a non-volatile memory, for example, a ROM, a flash memory, an HDD, or an SSD. The memory 40 may alternatively include a combination of the foregoing memories.

The system bus 43 may include a data bus, a power bus, a control bus, a signal status bus, and the like. In this embodiment, for a purpose of clear description, all buses are marked as the system bus 43 in FIG. 25.

The communications interface 42 may include a receiver and a transmitter. In addition, in a specific implementation of the access network device, the receiver and the transmitter may be specifically a transceiver of the access network device. The transceiver may be a wireless transceiver. For example, the wireless transceiver may be an antenna of the access network device or the like. The processor 41 sends and receives data with another device such as a UE by using the transceiver.

In a specific implementation process, all steps of the method procedure shown in any one of FIGS. 3, 4, 6, 8, 10, 12, 14, 16, or 18 can be implemented by using a computer executable instruction in a form of hardware executing software. To avoid repetition, details are not described herein again.

This embodiment of the present application provides the access network device. Based on descriptions of the foregoing embodiments, compared with a traditional process of establishing a radio link between an access network device and a UE, in the data transmission method provided in the embodiments of the present application, the UE does not need to initiate a random access process, so that signaling exchanges between the access network device and the UE are reduced, thereby saving network resources and improving data transmission efficiency.

An embodiment of the present application provides a data transmission system. The system includes an access network device and at least one user equipment. For details of descriptions of the user equipment, refer to related descriptions of the user equipment in the embodiments shown in FIGS. 19, 20, and 24. For details of descriptions of the access network device, refer to related descriptions of the access network device in the embodiments shown in FIGS. 21, 22, 23, and 25, and details are not described herein again.

In the data transmission system provided in this embodiment of the present application, the at least one user equipment implements the data transmission method in the embodiments of the present application by separately performing corresponding steps in the method procedure shown in any one of FIGS. 3, 4, 6, 8, 10, 12, 14, 16, or 18. Correspondingly, the access network device implements the data transmission method in the embodiments of the present application by performing corresponding steps in the method procedure shown in any one of FIGS. 3, 4, 6, 8, 10, 12, 14, 16, or 18.

It may be clearly understood by a person skilled in the art that, for the purpose of convenient and brief description, division of the foregoing function modules is taken as an example for illustration. In an actual application, the foregoing functions can be allocated to and implemented by different function modules according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method, comprising:
receiving, by a user equipment (UE), a scrambled control channel sent by an access network device;
descrambling, by the UE, the scrambled control channel by using a first identifier, to obtain control information and cyclic redundancy code (CRC), wherein the first identifier comprises a higher layer identifier of the UE and a radio network temporary identifier (RNTI);
in response to determining that a check on the CRC succeeds, receiving, by the UE according to the control information, data sent by the access network device; and
sending, by the UE, acknowledgement feedback information to the access network device, wherein a resource for sending the acknowledgement feedback information is a physical uplink control channel resource allocated in downlink scheduling, and wherein a feedback timing of the acknowledgement feedback information is indicated by the downlink scheduling.

2. The data transmission method according to claim 1, wherein the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an Internet Protocol (IP) address of the UE.

3. The data transmission method according to claim 1, wherein the descrambling, by the UE, the scrambled control channel by using the first identifier, to obtain the control information and the CRC comprises:
descrambling, by the UE, the scrambled control channel by using the higher layer identifier of the UE, to obtain the control information and scrambled CRC, and descrambling, by the UE, the scrambled CRC by using the RNTI, to obtain the CRC; or
decoding, by the UE, the scrambled control channel, to obtain scrambled CRC and scrambled control information, descrambling, by the UE, the scrambled control information by using the higher layer identifier of the UE, to obtain the control information, and descrambling, by the UE, the scrambled CRC by using the RNTI, to obtain the CRC.

4. A user equipment (UE), comprising:
a receiver configured to receive a scrambled control channel sent by an access network device;
a processor configured to:
after the receiver receives the scrambled control channel, descramble the scrambled control channel by using a first identifier, to obtain control information and cyclic redundancy code (CRC) and complete a check on the CRC, wherein the first identifier comprises a higher layer identifier of the UE and a radio network temporary identifier (RNTI);
wherein the receiver is further configured to:
in response to determining that the check on the CRC succeeds, receive, according to the control information, data sent by the access network device; and
a transmitter configured to:
after the receiver receives, according to the control information, the data sent by the access network device, send acknowledgement feedback information to the access network device, wherein a resource for sending the acknowledgement feedback information is a physical uplink control channel resource allocated in downlink scheduling, and wherein a feedback timing of the acknowledgement feedback information is indicated by the downlink scheduling.

5. The user equipment according to claim 4, wherein the higher layer identifier of the UE is any one or more of a system architecture evolution-temporary mobile subscriber identity (S-TMSI), a mobility management entity-temporary mobile subscriber identity (M-TMSI), an international mobile subscriber identity IMSI, or an Internet Protocol (IP) address of the UE.

6. The user equipment according to claim 4, wherein the processor is configured to:
descramble the scrambled control channel by using the higher layer identifier of the UE to obtain the control information and scrambled CRC, and descramble the scrambled CRC by using the RNTI to obtain the CRC; or
decode the scrambled control channel to obtain scrambled CRC and scrambled control information, descramble the scrambled control information by using the higher layer identifier of the UE to obtain the control information, and descramble the scrambled CRC by using the RNTI to obtain the CRC.

7. An access network device, comprising:
a processor configured to scramble a control channel by using a first identifier;
a transmitter configured to:
send a scrambled control channel to a user equipment (UE), and
send data to the UE, wherein the UE receives the data in response to determining that a check on a cyclic redundancy code (CRC) of the scrambled control channel succeeds, wherein the first identifier comprises a higher layer identifier of the UE and a radio network temporary identifier (RNTI); and
a receiver configured to:
after the transmitter sends the data to the UE, receive acknowledgement feedback information sent by the UE, wherein a resource for sending the acknowledgement feedback information is a physical uplink control channel resource allocated in downlink scheduling, and wherein a feedback timing of the acknowledgement feedback information is indicated by the downlink scheduling.

8. The access network device according to claim 7, wherein the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an Internet Protocol (IP) address of the UE.

9. The access network device according to claim 7, wherein the processor is configured to:
obtain cyclic redundancy code (CRC) and control information, scramble the CRC by using the RNTI to obtain scrambled CRC, and scramble the scrambled CRC and the control information by using the higher layer identifier of the UE to obtain the scrambled control channel; or
obtain CRC and control information, scramble the CRC by using the RNTI to obtain scrambled CRC, and scramble the control information by using the higher layer identifier to obtain scrambled control information, wherein the scrambled CRC and the scrambled control information form the scrambled control channel together.

* * * * *